(12) United States Patent
Kim et al.

(10) Patent No.: US 11,734,943 B2
(45) Date of Patent: Aug. 22, 2023

(54) ELECTRONIC DEVICE AND METHOD FOR OBTAINING INFORMATION ASSOCIATED WITH FINGERPRINT

(71) Applicant: SAMSUNG ELECTRONICS CO., LTD., Suwon-si (KR)

(72) Inventors: Taeho Kim, Suwon-si (KR); Yangsoo Lee, Suwon-si (KR); Hosang Lee, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 17/388,081

(22) Filed: Jul. 29, 2021

(65) Prior Publication Data
US 2021/0357604 A1    Nov. 18, 2021

Related U.S. Application Data

(63) Continuation of application No. 16/690,431, filed on Nov. 21, 2019, now Pat. No. 11,126,817.

(30) Foreign Application Priority Data

Nov. 22, 2018    (KR) .................. 10-2018-0145472

(51) Int. Cl.
*G06V 40/13*    (2022.01)
*G06F 21/32*    (2013.01)
(Continued)

(52) U.S. Cl.
CPC .......... *G06V 40/1306* (2022.01); *G06F 3/041* (2013.01); *G06F 3/04162* (2019.05);
(Continued)

(58) Field of Classification Search
CPC .......... G06F 3/041–047; G06F 3/0416–04186; G06F 3/044–0448; G06K 9/00006–0012; G06K 2009/0006; G06V 40/12–1394
See application file for complete search history.

(56) References Cited

U.S. PATENT DOCUMENTS 8,618,818 B2    12/2013    Otagaki et al.
9,886,613 B2     2/2018    Pi et al.
(Continued)

FOREIGN PATENT DOCUMENTS

CN    106775150 A    5/2017
CN    107977110 A    5/2018
(Continued)

OTHER PUBLICATIONS

Australian Examination Report dated Nov. 30, 2021 for AU Application No. 2019384601.
(Continued)

*Primary Examiner* — Patrick F Marinelli
(74) *Attorney, Agent, or Firm* — Nixon & Vanderhye P.C.

(57) ABSTRACT

An electronic device according to various embodiments may include a display, a touch sensor operatively coupled with the display, and a fingerprint sensor disposed below the display and operatively coupled with the touch sensor. The fingerprint sensor may be configured to obtain at least one image for calibrating a fingerprint image, receive a signal indicating detection of a touch input from the touch sensor while obtaining the at least one image, and cease to obtain the at least one image, based on the reception of the signal.

14 Claims, 13 Drawing Sheets

(51) Int. Cl.
  *G06F 3/041* (2006.01)
  *G06V 40/12* (2022.01)
  *H04L 9/40* (2022.01)
  *H04L 9/32* (2006.01)

(52) U.S. Cl.
  CPC .......... *G06F 21/32* (2013.01); *G06V 40/1347* (2022.01); *H04L 9/3231* (2013.01); *H04L 63/0861* (2013.01)

(56) References Cited

U.S. PATENT DOCUMENTS

| | | | |
|---|---|---|---|
| 10,108,840 | B2 | 10/2018 | Andersson et al. |
| 10,775,926 | B2 * | 9/2020 | Jhang .................... G06F 3/0412 |
| 11,010,579 | B2 | 5/2021 | Han |
| 11,521,201 | B2 * | 12/2022 | Rhee ................ G06Q 20/40145 |
| 2005/0270140 | A1 * | 12/2005 | Oh ........................ G06K 9/6255 340/5.83 |
| 2014/0092068 | A1 * | 4/2014 | Zheng ................... G06F 3/0421 345/175 |
| 2015/0054764 | A1 * | 2/2015 | Kim ...................... G06F 3/0416 345/173 |
| 2015/0324570 | A1 | 11/2015 | Lee et al. |
| 2016/0034741 | A1 | 2/2016 | Lan et al. |
| 2016/0034742 | A1 * | 2/2016 | Kim ................... H04M 1/72412 382/124 |
| 2017/0061108 | A1 * | 3/2017 | Kwon ................ G06V 40/1306 |
| 2017/0098109 | A1 | 4/2017 | Carling et al. |
| 2017/0140233 | A1 | 5/2017 | Andersson et al. |
| 2017/0300736 | A1 | 10/2017 | Song et al. |
| 2017/0328866 | A1 | 11/2017 | Apte et al. |
| 2018/0012057 | A1 * | 1/2018 | Cho ......................... G09G 3/36 |
| 2018/0114047 | A1 | 4/2018 | Kim et al. |
| 2018/0181735 | A1 | 6/2018 | Yang et al. |
| 2018/0218195 | A1 * | 8/2018 | Sheik-Nainar ......... G06V 40/13 |
| 2018/0293370 | A1 | 11/2018 | Kim et al. |
| 2019/0251329 | A1 * | 8/2019 | Jiang .................. G06V 40/1365 |
| 2019/0354226 | A1 | 11/2019 | Choi et al. |
| 2019/0362129 | A1 * | 11/2019 | Sandhan ................ G02F 1/1333 |
| 2019/0362172 | A1 * | 11/2019 | Chien ................... G06V 10/758 |
| 2020/0167540 | A1 * | 5/2020 | Kim ..................... G06F 3/04162 |
| 2020/0241725 | A1 * | 7/2020 | Jhang .................... G06F 3/0412 |
| 2020/0264755 | A1 * | 8/2020 | Jin ........................ G06F 3/0412 |
| 2020/0273401 | A1 * | 8/2020 | Lee .................... G06F 3/041661 |
| 2020/0275001 | A1 * | 8/2020 | Jhang ................... H04N 5/2257 |
| 2020/0371660 | A1 * | 11/2020 | Chen ................... G06F 3/04883 |
| 2021/0357604 | A1 * | 11/2021 | Kim ........................ G06F 3/041 |

FOREIGN PATENT DOCUMENTS

| | | |
|---|---|---|
| KR | 10-2016-0142716 | 12/2016 |
| KR | 10-2018-0059720 | 6/2018 |
| KR | 10-2018-0085587 | 7/2018 |
| KR | 10-2018-0089093 | 8/2018 |
| KR | 10-2018-0089093 A | 8/2018 |
| KR | 10-2018-0116013 A | 10/2018 |
| WO | 2018/135884 | 7/2018 |

OTHER PUBLICATIONS

AU Notice of Acceptance dated Mar. 25, 2022 for AU Application No. AU2019384601.
U.S. Appl. No. 16/690,431, filed Nov. 21, 2019; Kim et al.
International Search Report and Written Opinion dated Mar. 18, 2020 in counterpart International Patent Application No. PCT/KR2019/016046.
Partial Search Report dated Apr. 8, 2020 in counterpart European Patent Application No. EP19210623.5.
Search Report and Written Opinion dated Jul. 3, 2020 in counterpart European Patent Application No. EP19210623.5.
European Office Action dated Jun. 29, 2021 for EP Application No. 19210623.5.
Chinese Office Action dated Mar. 18, 2023 for CN Application No. 201911153460.7.

* cited by examiner

ELECTRONIC DEVICE AND METHOD FOR OBTAINING INFORMATION ASSOCIATED WITH FINGERPRINT

CROSS REFERENCE TO RELATED APPLICATION

This application is a Continuation of U.S. application Ser. No. 16/690,431, filed Nov. 21, 2019, which claims priority to KR 10-2018-0145472, filed Nov. 22, 2018, the entire contents of which are all hereby incorporated herein by reference in their entireties.

BACKGROUND

Field

The disclosure relates to an electronic device for obtaining information associated with a fingerprint, and a method thereof.

Description of Related Art

A method for authentication a user using a fingerprint is used to enhance security of an electronic device. In order to authenticate the user using the fingerprint, the electronic device may include a fingerprint sensor to obtain a fingerprint image.

In order to provide enhanced usability, there are growing needs for including a fingerprint sensor disposed as an in-display type in an electronic device. Therefore, a method for performing authentication using the fingerprint sensor disposed as an in-display type may be required.

SUMMARY

Embodiments of the disclosure are not limited to the technical problems mentioned above, and other unmentioned technical problems can be clearly understood by those skilled in the art from descriptions below.

An electronic device according to various example embodiments may include a display, a touch sensor operatively coupled with the display, and a fingerprint sensor disposed below the display and operatively coupled with the touch sensor. The fingerprint sensor may be configured to: obtain at least one image for calibrating a fingerprint image, receive a signal indicating detection of a touch input from the touch sensor while obtaining the at least one image, and cease to obtain the at least one image based on the reception of the signal.

An electronic device according to various example embodiments may include a display, a fingerprint sensor disposed below the display, a touch sensor operatively coupled with the display and the fingerprint sensor, and at least one processor. The fingerprint sensor may be configured to receive from the at least one processor a signal requesting the fingerprint sensor to obtain the at least one fingerprint image to register a fingerprint or to recognize the fingerprint, identify whether the signal indicating detection of a touch input is received from the touch sensor, in response to receiving the signal requesting to obtain the at least one fingerprint image, obtain the at least one fingerprint image in response to receiving the signal indicating the detection of the touch input from the touch sensor, and transmit, to the at least one processor, information on the at least one fingerprint image for the registration or recognition of the fingerprint, in response to the obtaining.

An electronic device according to various example embodiments may include a display, a fingerprint sensor disposed below the display, a touch sensor operatively coupled with the fingerprint sensor and the display, and at least one processor. The fingerprint sensor is configured to receive a signal requesting the fingerprint sensor to obtain a fingerprint image from the at least one processor while the fingerprint sensor is in an inactive state, switch a state of the fingerprint sensor to a standby state for identifying whether a signal indicating detection of a touch input is received from the touch sensor in response to receiving the signal requesting to obtain the at least one fingerprint image, switch the standby state to an active state in response to receiving the signal indicating the detection of the touch input from the touch sensor while in the standby state, obtain the fingerprint image in response to the switching, and transmit information on the fingerprint image to the at least one processor in response to the obtaining.

A method for operating an electronic device according to various example embodiments may include obtaining at least one image for calibrating a fingerprint image by a fingerprint sensor of the electronic device, the fingerprint sensor being disposed below a display of the electronic device, receiving a signal indicating detection of a touch input from the touch sensor of the electronic device while the fingerprint sensor obtains the at least one image, and ceasing to obtain the at least one image by the fingerprint sensor, based on the reception of the signal.

A method for operating an electronic device according to various example embodiments may include receiving from the at least one processor of the electronic device by a fingerprint sensor of the electronic device disposed below a display of the electronic device, a signal requesting to obtain the at least one fingerprint image to register a fingerprint or to recognize the fingerprint, identifying whether the signal indicating detection of a touch input is received from the touch sensor of the electronic device, in response to receiving the signal requesting to obtain the at least one fingerprint image by the fingerprint sensor, obtaining, the at least one fingerprint image in response to receiving the signal indicating the detection of the touch input by the fingerprint sensor from the touch sensor of the electronic device, and transmitting information on the at least one fingerprint image for the registration or recognition of the fingerprint to the at least one processor by the fingerprint sensor in response to the obtaining.

A method for operating an electronic device according to various example embodiments may include receiving, from the at least one processor of the electronic device by a fingerprint sensor a signal requesting to obtain a fingerprint image, while the fingerprint sensor of the electronic device, disposed below a display of the electronic device, is in an inactive state, switching a state of the fingerprint sensor to a standby state for identifying whether a signal indicating detection of a touch input is received from the touch sensor of the electronic device in response to receiving the signal requesting the fingerprint sensor to obtain the at least one fingerprint image by the fingerprint sensor, switching the standby state to an active state by the fingerprint sensor in response to receiving the signal indicating the detection of the touch input from the touch sensor while the fingerprint sensor is in the standby state, obtaining the fingerprint image by the fingerprint sensor in response to the switching, and transmitting information on the fingerprint image to the at least one processor by the fingerprint sensor in response to the obtaining.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
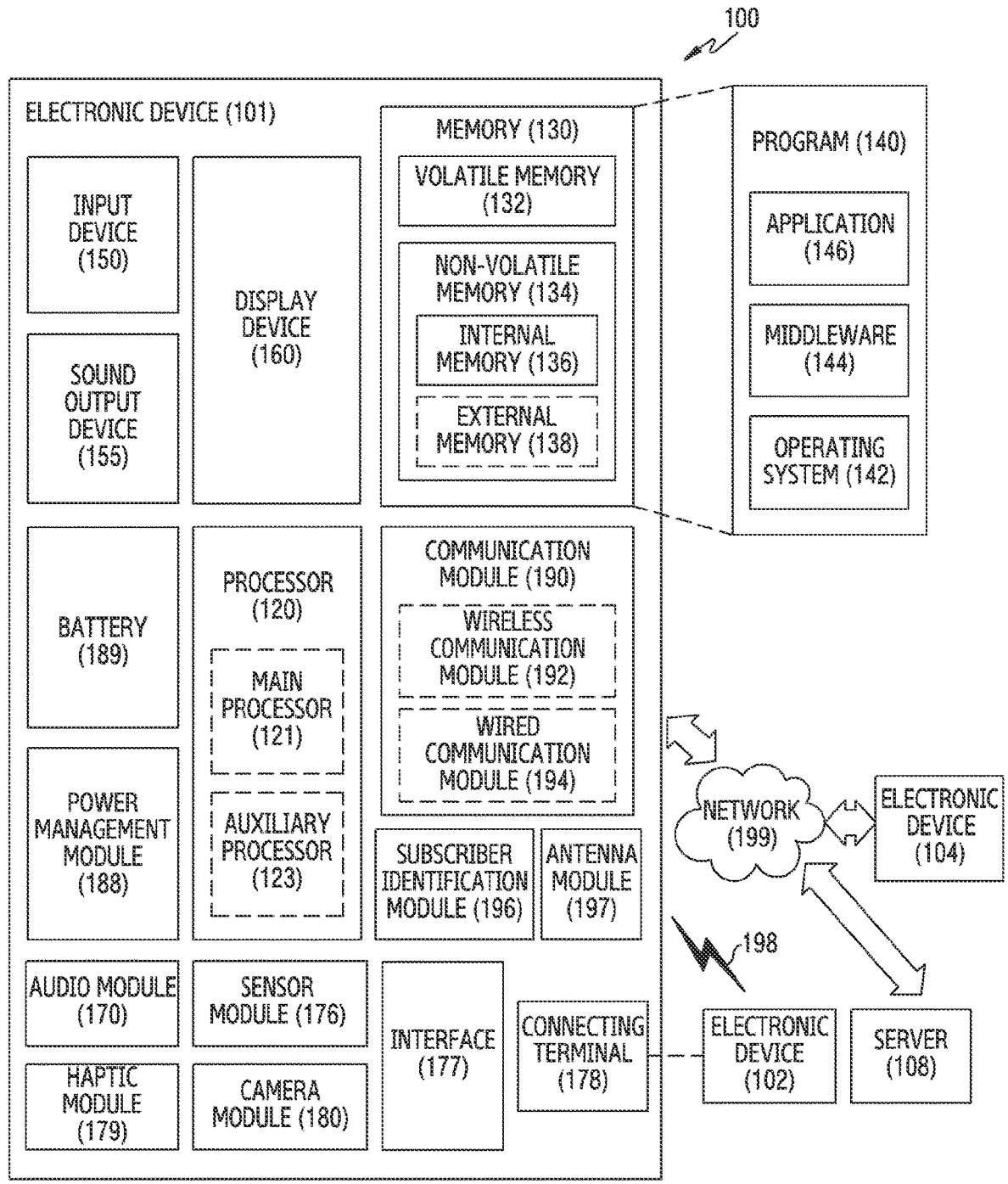
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium may refer to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
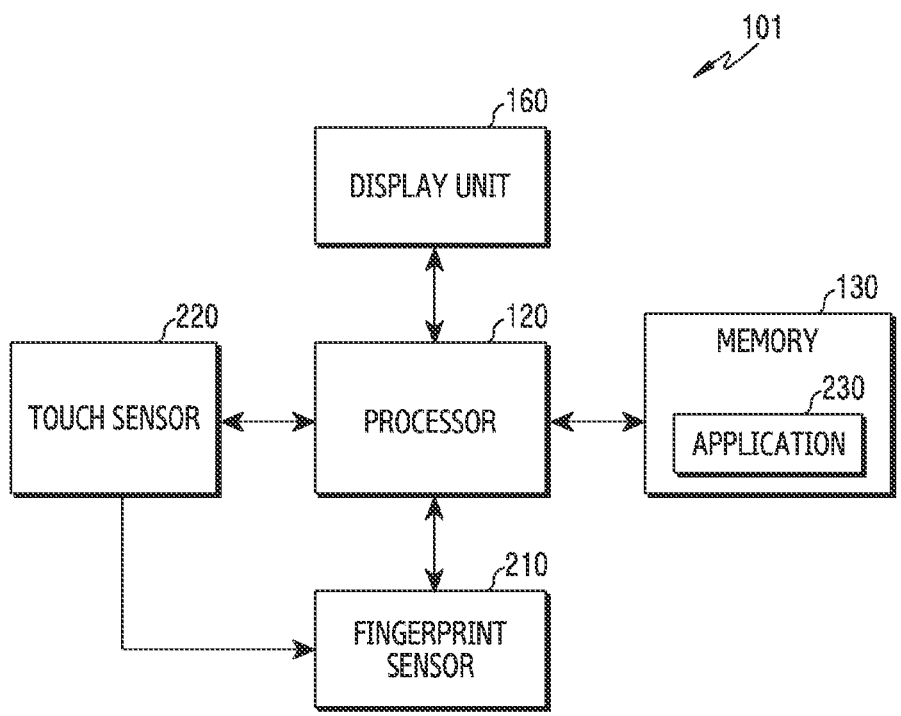
FIG. 2 is a block diagram illustrating an example electronic device according to various embodiments.

FIG. 2 is a block diagram illustrating an example electronic device according to various embodiments. The functional structures of the electronic device may be included in the electronic device 101 of FIG. 1.

Referring to FIG. 2, an electronic device 101 may include a processor (e.g., including processing circuitry) 120, a memory 130, a display unit (e.g., including a display) 160, a fingerprint sensor 210, and a touch sensor 220.

In various embodiments, the processor 120 may include various processing circuitry including, for example, the processor 120 of FIG. 1. The memory 130 may include the memory 130 of FIG. 1. The display unit 160 may include the display unit 160 of FIG. 1. The fingerprint sensor 210 may be included in the sensor module 176 of FIG. 1, and may include the fingerprint sensor embedded in the display unit 160. The touch sensor 220 may include at least one of a touch circuit included in the display unit 160 of FIG. 1 and a sensor circuit included in the display unit 160.

In various embodiments, the processor 120 and the memory 130 may be disposed inside a housing of the electronic device 101. In various embodiments, the housing may be used to mount other components (e.g., the display unit 160, the fingerprint sensor 210, and the touch sensor 220) in the electronic device 101.

In various embodiments, the display unit 160 may be disposed inside the housing. In various embodiments, the display unit 160 may be exposed or viewable through at least part of a first face of the housing of the electronic device 101.

In various embodiments, the touch sensor 220 may be disposed inside the housing. In various embodiments, the touch sensor 220 may be operatively coupled with the display unit 160.

In various embodiments, at least part of the fingerprint sensor 210 may be disposed below the display unit 160. In various embodiments, the fingerprint sensor 210 may be disposed within a display region of the display unit 160, when viewed from above the display unit 160 exposed or viewable through the first face. For example, at least one of a transmitter of the fingerprint sensor 210 and a receiver of the fingerprint sensor 210 may be disposed within an interval between patterns of light emitting elements in the display unit 160 or within an interval between patterns of the touch sensor 220.

Figure 3:
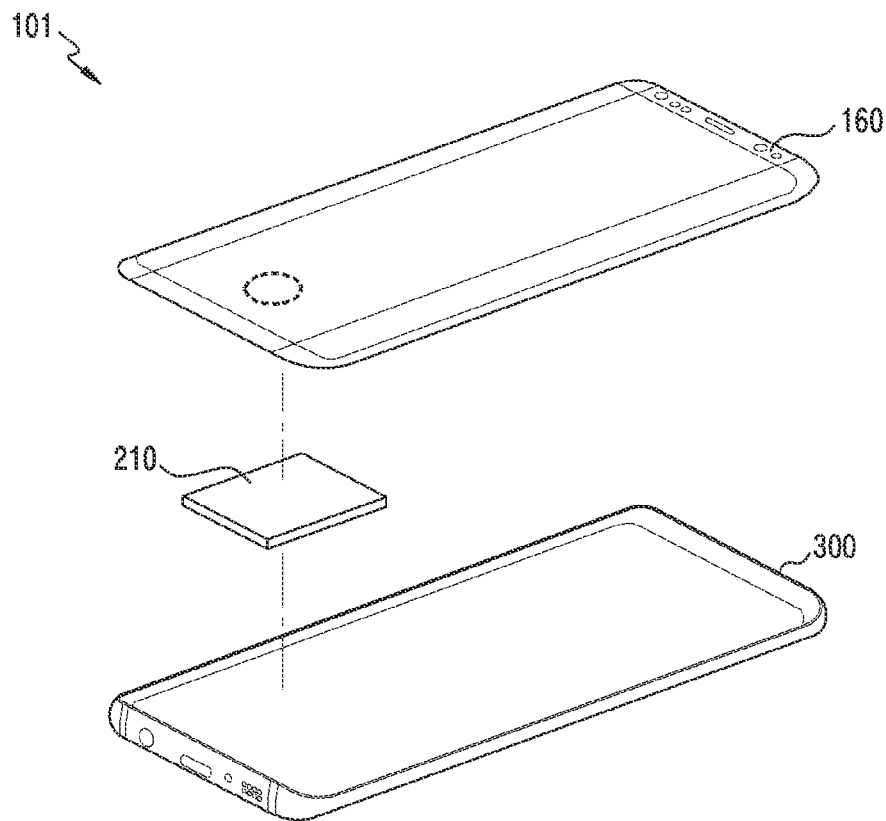
FIG. 3 is an exploded perspective view illustrating an example fingerprint sensor and a display in an electronic device according to various embodiments.

For example, referring to FIG. 3, the fingerprint sensor 210 may be disposed below the display unit 160 exposed or viewable through at least part of the housing 300 of the electronic device 101. In various embodiments, although not shown in FIG. 3, the transparent touch sensor 220 may be operatively coupled with the display unit 160.

In various embodiments, the fingerprint sensor 210 may be operatively coupled with the touch sensor 220. In various embodiments, the fingerprint sensor 210 may be physically connected with the touch sensor 220. For example, the fingerprint sensor 210 may be connected with the touch sensor 220 through an interface capable of transmitting and receiving data.

In various embodiments, the fingerprint sensor 210 may recognize a fingerprint based on various methods. For example, the fingerprint sensor 210 may be implemented with an ultrasonic fingerprint sensor which transmits an ultrasonic wave to recognize a fingerprint based on a reflected wave for the transmitted ultrasonic wave. For another example, the fingerprint sensor 210 may also be implemented with an optical fingerprint sensor which transmits light to recognize a fingerprint based on reflected light for the transmitted light. For another example, the fingerprint sensor 210 may also be implemented with a capacitive fingerprint sensor which recognizes a fingerprint based on a capacitance change. However, the disclosure is not limited thereto.

In various embodiments, the fingerprint sensor 210 may interwork with the touch sensor 220 to obtain at least one fingerprint image for a user's finger contacted on the display unit 160 or obtain at least one image for calibrating the at least one fingerprint image.

For example, the fingerprint sensor 210 may receive from the processor 120 a signal requesting the fingerprint sensor 210 to obtain at least one fingerprint image in order to register a fingerprint. In various embodiments, the processor 120 may receive a user input to register a fingerprint for authentication, through a user interface displayed on the display unit 160. In response to receiving the user input, the processor 120 may transmit to the fingerprint sensor 210 a signal requesting the fingerprint sensor 210 to obtain the at least one fingerprint image.

In various embodiments, in response to receiving the signal from the processor 120, the fingerprint sensor 210 may identify whether a signal indicating detection of the touch input contacted on the display unit 160 is received from the touch sensor 220. For example, the fingerprint sensor 210 may identify whether the signal for notifying that the touch input is detected is received from the touch sensor 220 through the interface between the touch sensor 220 and the fingerprint sensor 210. For the identification, in response to receiving the signal from the processor 120, the fingerprint sensor 210 may change or switch a state of the fingerprint sensor 210 to a standby state for receiving the signal indicating the detection of the touch input from the touch sensor 220. In various embodiments, the fingerprint sensor 210 may maintain the standby state until the touch input is received or may maintain the standby state until a designated time elapses from a timing of the switching. However, the disclosure is not limited thereto.

In various embodiments, the fingerprint sensor 210 may receive the signal indicating the detection of the touch input from the touch sensor 220. In response to receiving the signal from the touch sensor 220, the fingerprint sensor 210 may recognize that a user's finger is contacted on the display unit 160.

In various embodiments, in response to receiving the signal indicating the detection of the touch input from the touch sensor 220, the fingerprint sensor 210 may obtain at least one fingerprint image. In various embodiments, the at least one fingerprint image may be used to register a fingerprint for user authentication. In various embodiments, the at least one fingerprint image may be obtained while the user's finger is contacted on the display unit 160. In various embodiments, since the obtaining of the at least one fingerprint image is performed while the user's finger is contacted on the display unit 160, the at least one fingerprint image may have enhanced quality.

In various embodiments, the fingerprint sensor 210 may transmit information on the at least one fingerprint image to the processor 120, in order to register the fingerprint for user authentication. In various embodiments, the processor 120 may receive the information on the at least one fingerprint image from the fingerprint sensor 210.

In various embodiments, the memory 130 may store the application 230 executed in a secure execution environment of the processor 120. In various embodiments, the secure execution environment may be distinct from a general execution environment configured in the processor 120. In various embodiments, the secure execution environment may have a higher security than the general execution environment. It should be noted that the general execution environment may have a lower security than the secure execution environment and does not necessarily refer to an environment without a security setting. In various embodiments, the application 230 may be used to remove at least part of operations of the electronic device for registering a fingerprint and operations of the electronic device for calibrating an obtained fingerprint image to recognize the fingerprint. In various embodiments, the processor 120 may request the application 230 executed in the secure execution environment to obtain at least one fingerprint image for the fingerprint registration, by accessing the memory 130 in response to receiving a user input for requesting to register the fingerprint. For example, based on the user input, the processor 120 may allocate at least one first core among multiple cores configuring the processor 120 to a core for the secure execution environment, and may use at least one second core for the general execution environment among the multiple cores to request the application executed by the at least one first core to obtain the at least one fingerprint image for the fingerprint registration. In various embodiments, in response to the request, the application 230 may request the fingerprint sensor 210 to identify whether the signal indicating the detection of the touch input is received from the touch sensor 220. In response to the request of the application 230, the fingerprint sensor 210 may identify whether the signal indicating the detection of the touch input is received from the touch sensor 220, and may obtain the at least one fingerprint image in response to receiving the signal from the touch sensor 220. The fingerprint sensor 210 may provide information on the at least one fingerprint image to the application 230. For example, the fingerprint sensor 210 may provide the information on the at least one fingerprint image to the application 230 through the at least one first core of the processor 120. The application 230 may register the at least one fingerprint image into a security region of the memory 130, in order to use the at least one fingerprint image as a reference fingerprint image for fingerprint recognition. In various embodiments, in response to receiving information on the fingerprint image, the application 230 may notify the processor 120 that the obtaining of the fingerprint image is successfully complete. The processor 120 may request the application 230 executed in the secure execution environment to identify whether the touch input is released, based on the notification from the application 230. For example, the processor 120 may request the application 230 executed by the at least one first core to identify whether the touch input is released, using the at least one second core. In various embodiments, the request may be provided to the application 230 from the processor 120 to finish operations for registering the fingerprint. The application 230 may request the fingerprint sensor 210 to identify whether the touch input is released, in response to the request from the processor 120. The fingerprint sensor 210 may identify whether a signal indicating the release of the touch input is received from the touch sensor 220, in response to the request from the application 230. In various embodiments, the fingerprint sensor 210 may notify the application 230 that the signal indicating the release of the touch input is received from the touch sensor 220, in response to receiving the signal indicating the release of the touch input or the release of a contact of the touch input from the touch sensor 220. For example, the fingerprint sensor 210 may notify the application 230 that the signal indicating the release of the touch input is received from the touch sensor 220 through the at least one first core. The application 230 may notify the processor 120 that operations for the registration of the fingerprint are complete, based on the notification from the fingerprint sensor 210.

As described above, the electronic device 101 according to various embodiments may obtain a fingerprint image for registering a fingerprint using the fingerprint sensor 210 under the condition that the touch sensor 220 detects that a user's finger is contacted on the display unit 160, thereby obtaining the fingerprint image having enhanced quality.

For another example, the fingerprint sensor 210 may obtain at least one image for calibrating the fingerprint image obtained through the fingerprint sensor 210, based on interworking with the touch sensor 220. In various embodiments, the fingerprint sensor 210 may obtain the at least one image for the calibration, based on detecting that a designated event occurs. In various embodiments, the at least one image for the calibration may imply an image requested to be obtained in a state where the user's finger is not included as an object. In various embodiments, the at least one image for the calibration may imply an image obtained to tune the fingerprint sensor 210 for the calibration of the fingerprint image.

In various embodiments, the designated event may imply that a temperature measured by the electronic device 101 corresponds to a temperature associated with a value having a lower reliability than a reference reliability among a plurality of values registered to the memory 130 for the calibration. For example, assume that the memory 130 stores a value 'a' associated with about 10 degrees Celsius, a value 'b' associated with about 20 degrees Celsius, and a value 'c' associated with about 30 degrees Celsius for the calibration, and the value 'b' has a lower reliability than the value 'a' and the value 'c'. The fingerprint sensor 210 may determine that the at least one image for the calibration is obtained to improve reliability of the value 'b', based on identifying that a current temperature measured by the electronic device 101 corresponds to 20 degrees Celsius, and may obtain the at least one image, based on the determination. However, the disclosure is not limited thereto.

In various embodiments, the designated event may imply that a designated time elapses from a timing at which a directly previous calibration is performed. For example, based on identifying that it has passed three days (a designated time) after the directly previous calibration is performed, the fingerprint sensor 210 may obtain the at least one image to improve reliability of at least part of the plurality of values. However, the disclosure is not limited thereto.

In various embodiments, based on detecting the occurrence of the event, the fingerprint sensor 210 may notify the processor 120 that the at least one image is obtained for the calibration. The processor 120 may access the memory 130 in response to receiving the notification from the fingerprint sensor 210, and thus may request the application 230 executed by the at least one first core allocated for the secure execution environment to obtain the at least one image for the calibration, using the at least one second core for the general execution environment. In response to the request from the processor 120, the application 230 may request the processor 120 to wait for an operation in the general execution environment for a designated time. In response to the request from the processor 120, the application 230 may request the processor 120 to identify whether a touch input is received while the fingerprint sensor 210 obtains the at least one image. The request from the application 230 may be provided to the fingerprint sensor 210 through the processor 120 (or the at least one second core of the processor 120). In response to the request from the application 230, the fingerprint sensor 210 may obtain the at least one image, and may provide information on the obtained at least one image to the application 230 for the calibration. For example, the fingerprint sensor 210 may provide the information on the at least one image to the application 230 through the at least one first core of the processor 120. The application 230 may improve reliability of at least part of the plurality of values, at least based on the information on the at least one image. Based on identifying the improvement of the reliability of at least part of the plurality of values, the application 230 may notify the processor 120 (or the at least one second core of the processor 120) that the calibration is successfully complete. Based on the notification from the application 230, the processor 120 may resume the ceased operation in the general execution environment.

According to an embodiment, the fingerprint sensor 210 may receive a signal indicating that the touch input is detected from the touch sensor 220, while obtaining the at least one image. In response to receiving the signal from the touch sensor 220, in order to cease the calibration, the fingerprint sensor 210 may cease to obtain the at least one image. In response to receiving the signal from the touch sensor 220, in order to cease the calibration, the fingerprint sensor 210 may transmit the signal indicating the detection of the touch input while obtaining the at least one image. In response to receiving the signal from the fingerprint sensor 210, the processor 120 may use the at least one second core to request, through the at least one first core, the application 230 to cease the calibration. The application 230 may cease the calibration, in response to the request from the processor 120.

The fingerprint sensor 210 may cease to obtain the at least one image, based on identifying that a value identified based on the at least one image is out of a reference range. For example, if a foreign material is located on the fingerprint sensor 210, the value identified based on the at least one image may be out of the reference range. Since the at least one image may cause an incorrect calibration or an unnecessary calibration, the fingerprint sensor 210 may cease to obtain the at least one image, based on the identification. Based on the identification, in order to cease the calibration, the fingerprint sensor 210 according to various embodiments may transmit a signal for notifying the processor 120 (e.g., the at least one second core) that the foreign material is detected. In response to receiving the signal from the fingerprint sensor 210, the processor 120 may request the application 230 to cease the calibration. For example, in response to receiving the signal from the fingerprint sensor 210, the processor 120 may use the at least one second core to request, through the at least one first core, the application 230 to cease the calibration. In various embodiments, the application 230 may cease the calibration, in response to the request from the processor 120.

As described above, the electronic device 101 according to various embodiments may identify whether a touch input is received based on signaling between the touch sensor 220 and the fingerprint sensor 210 while obtaining at least one image for calibrating a fingerprint image using the fingerprint sensor 210. In response to detecting the touch input while obtaining the at least one image using the fingerprint sensor 210, the electronic device 101 according to various embodiments may cease the calibration to prevent and/or reduce an unnecessary calibration and/or an incorrect calibration from being performed. In response to detecting the touch input while obtaining the at least one image using the fingerprint sensor 210, the electronic device 101 according to various embodiments may cease the calibration to prevent and/or reduce power from being consumed for the unnecessary or incorrect calibration.

For another example, the fingerprint sensor 210 may obtain a fingerprint image for recognition, based on interworking with the touch sensor 220. In various embodiments, after registering the fingerprint image as a reference fingerprint image, the fingerprint sensor 210 may obtain a fingerprint image to be recognized for user authentication. In various embodiments, the fingerprint sensor 210 may receive from the processor 120 a signal requesting to obtain the fingerprint image. In various embodiments, the signal may be transmitted from the processor 120 to the fingerprint sensor 210, based on that the processor 120 detects a designated event. In various embodiments, the designated event may include detecting an execution of an application which requires fingerprint recognition. In various embodiments, the designated event may include detecting a user's gesture for unlocking the electronic device 101. However, the disclosure is not limited thereto.

In various embodiments, in response to receiving the signal from the processor 120, the fingerprint sensor 210 may switch a state of the fingerprint sensor 210 to a standby state for identifying whether a signal indicating detection of a touch input is received from the touch sensor 220. In various embodiments, the standby state may be released after being maintained for a designated time. In various embodiments, the standby state may also be maintained until the signal indicating the detection of the touch input is received. The fingerprint sensor 210 may receive the signal indicating the detection of the touch input from the touch sensor 220, while in the standby state. The fingerprint sensor 210 may obtain the fingerprint image, in response to receiving the signal from the touch sensor 220. Since the receiving of the signal from the touch sensor 220 may indicate that a user's finger is contacted on the display unit 160, the fingerprint sensor 210 may obtain the fingerprint image, in response to receiving the signal from the touch sensor 220. For example, in response to receiving the signal from the touch sensor 220, the fingerprint sensor 210 may switch the standby state to an active state for obtaining the fingerprint image, and may obtain the fingerprint image in response to the switching. In various embodiments, the fingerprint sensor 210 may transmit information on the fingerprint image to the processor 120. For example, the fingerprint sensor 210 may provide the information on the fingerprint image to the application 230 executed in the secure execution environment. The application 230 may compare the fingerprint image received from the fingerprint sensor 210 with a reference fingerprint image registered to the electronic device 101, and may identify whether to authenticate a user who provides the fingerprint image, based on the comparison result.

The fingerprint sensor 210 may switch the active state to the standby state, in response to transmitting the information on the fingerprint image. For example, the standby state may imply a state for identifying whether a signal indicating the release of the touch input is received from the touch sensor 220. While in the standby state for identifying whether the signal indicating the release of the touch input is received from the touch sensor 220, the fingerprint sensor 210 may transmit the signal indicating the release of the touch input to the processor 120, in response to receiving a signal for notifying the release of the touch input from the touch sensor 220. The processor 120 may notify the application 230 of the release of the touch input. The application 230 may end the operation for fingerprint recognition, based on the notification from the processor 120. Meanwhile, after the fingerprint sensor 210 transmits to the processor 120 the signal for notifying the release of the touch input, the state of the fingerprint sensor 210 may be switched to an inactive state. In various embodiments, the inactive state may imply a state where a function of the fingerprint sensor 210 is partially (or entirely) deactivated to decrease power consumption.

As described above, the electronic device 101 according to various embodiments may obtain a fingerprint image for recognition, based on interworking between the touch sensor 220 and the fingerprint sensor 210, thereby obtaining the fingerprint image having enhanced quality. The electronic device 101 according to various embodiments may use the operation of obtaining the fingerprint image to prevent and/or reduce an occurrence of a situation in which a fingerprint of an authenticated user from being incorrectly recognized.

An electronic device (e.g., the electronic device 101) according to various example embodiments described above may include a display (e.g., the display unit 160), a touch sensor (e.g., the fingerprint sensor 210) operatively coupled with the display, and a fingerprint sensor (e.g., the touch sensor 220) disposed below the display and operatively coupled with the touch sensor. The fingerprint sensor may be configured to obtain at least one image for calibrating a fingerprint image, receive a signal indicating detection of a touch input from the touch sensor while obtaining the at least one image, and cease to obtain the at least one image, based on the reception of the signal.

In various example embodiments, the electronic device may further include at least one processor (e.g., the processor 120). The fingerprint sensor may be configured to cease to obtain the at least one image by transmitting a different signal indicating reception of the signal to the at least one processor, in response to the reception of the signal. In various example embodiments, the electronic device may further include a memory (e.g., the memory 130) configured to store an application (e.g., the application 230) executed in a secure execution environment of the at least one processor. The at least one processor may be configured to request the application executed in the secure execution environment to cease the calibration by accessing the memory, in response to receiving the different signal.

In various example embodiments, the fingerprint sensor may be further configured to cease to obtain the at least one image, based on identifying that a value identified based on the at least one image is out of a reference range.

In various example embodiments, the fingerprint sensor may be further configured to include a memory (e.g., the memory 130) configured to store a plurality of values used for the calibration of the fingerprint image and associated with a plurality of temperatures, identify that a measure temperature corresponds to a temperature associated with a value having a lower reliability than a reference reliability among the plurality of temperatures, and obtain the at least one image, based on the identification. In various example embodiments, the electronic device may further include at least one processor, and a memory configured to store an application executed in a secure execution environment of the at least one processor. The fingerprint sensor may be configured to transmit to the at least one processor a signal indicating that the calibration is required, in response to the identification. The at least one processor may be configured to request the application to initiate the calibration by accessing the memory, in response to receiving the signal indicating that the calibration is required, and request the fingerprint sensor to monitor whether the signal indicating the detection of the touch input is received from the touch sensor, in response to obtaining the response for the request from the application. The fingerprint sensor may be further configured to monitor whether the signal indicating the detection of the touch input is received from the touch sensor while the at least one image is obtained, in response to the request from the at least one processor.

In various example embodiments, the fingerprint sensor may be configured to identify that a designated time elapses from a timing at which a directly previous calibration is performed, and obtain the at least one image, based on the identification.

An electronic device according to various example embodiments described above may include a display, a fingerprint sensor disposed below the display, a touch sensor operatively coupled with the display and the fingerprint sensor, and at least one processor. The fingerprint sensor may be configured to receive from the at least one processor a signal requesting the fingerprint sensor to obtain the at least one fingerprint image to register a fingerprint or to recognize the fingerprint, identify whether the signal indicating detection of a touch input is received from the touch sensor, in response to receiving the signal requesting to obtain the at least one fingerprint image, obtain the at least one fingerprint image, in response to receiving the signal indicating the detection of the touch input from the touch sensor, and transmit information on the at least one fingerprint image for the registration or recognition of the fingerprint to the at least one processor, in response to the obtaining. In various example embodiments, the fingerprint sensor may be configured to receive a signal indicating that the touch input is released from the touch sensor, after transmitting the information on the at least one fingerprint image, and transmit the signal indicating that the touch input is released to the at least one processor, in response to receiving the signal indicating that the touch input is released. In various example embodiments, the fingerprint sensor may be configured to switch a state of the fingerprint sensor to a standby state for identifying whether the signal indicating the detection of the touch input is received from the touch sensor, in response to receiving the signal requesting to obtain the at least one fingerprint image, switch the standby state to an active state for obtaining the at least one fingerprint image, in response to receiving the signal indicating the detection of the touch input from the touch sensor, obtain the at least one fingerprint image, in response to the switching, and switch the active state to the standby state for identifying whether the signal indicating that the touch input is released is received, after obtaining the at least one fingerprint image.

In various example embodiments, the electronic device may further include a memory configured to store an application executed in a secure execution environment of the at least one processor. The at least one processor may be configured to request the application executed in the secure execution environment by accessing the memory to obtain the at least one fingerprint image in order to register the fingerprint image, in response to receiving a user input for requesting to register the fingerprint, and transmit to the fingerprint sensor the signal requesting to obtain the at least one fingerprint image, using the application which receives the request. In various example embodiments, the application may be configured to notify the at least one processor of a signal indicating that the fingerprint image is successfully obtained, based on receiving information on the at least one fingerprint image. In various example embodiments, the fingerprint sensor may be configured to receive a signal indicating that the touch input is released from the touch sensor, after transmitting the information on the at least one fingerprint image, and transmit the signal indicating that the touch input is released to the at least one processor, in response to receiving the signal indicating that the touch input is released. The at least one processor may be further configured to receive a signal indicating that the touch input is released from the fingerprint sensor using the application, and identify that the registering of the fingerprint is successfully complete using the application, based on receiving the signal indicating that the touch input is released from the fingerprint sensor.

In various example embodiments, the fingerprint sensor may be further configured to receive a signal indicating that the touch input is released from the touch sensor, after transmitting the information on the at least one fingerprint image, transmit the signal indicating that the touch input is released to the at least one processor, in response to receiving the signal indicating that the touch input is released, and switch a state of the fingerprint sensor to an inactive state, based on the transmission.

An electronic device according to various example embodiments described above may include a display, a fingerprint sensor disposed below the display, a touch sensor operatively coupled with the fingerprint sensor and the display, and at least one processor. The fingerprint sensor may be configured to receive a signal requesting the fingerprint sensor to obtain a fingerprint image from the at least one processor while in an inactive state, switch a state of the fingerprint sensor to a standby state for identifying whether a signal indicating detection of a touch input is received from the touch sensor, in response to receiving the signal requesting to obtain the at least one fingerprint image, switch the standby state to an active state, in response to receiving the signal indicating the detection of the touch input from the touch sensor while in the standby state, obtain the fingerprint image, in response to the switching, and transmit information on the fingerprint image to the at least one processor, in response to the obtaining. In various example embodiments, the electronic device may further include a memory configured to store an application executed in a secure execution environment of the at least one processor. The at least one processor may be configured to receive information on the fingerprint image using the application, compare the fingerprint image with a reference fingerprint image registered in the electronic device using the application, and identify whether to authenticate a user who provides the fingerprint image, based on the comparison result.

In various example embodiments, the fingerprint sensor may be further configured to switch the active state to a standby state for identifying whether a signal indicating that the touch input is released from the touch sensor, based on transmitting the information on the fingerprint image. In various example embodiments, the fingerprint sensor may be further configured to receive the signal indicating that the touch input is released from the touch sensor, while in the standby state for identifying whether the signal indicating the release of the touch input is received from the touch sensor, and based on receiving the signal indicating that the touch input is released from the touch sensor, switch the standby state for identifying whether the signal is received from the touch sensor to the inactive state. In various example embodiments, the fingerprint sensor may be configured to transmit to the at least one processor the signal indicating that the touch input is released, in response to receiving the signal indicating that the touch input is released from the touch sensor, and after transmitting the signal indicating that the touch input is released, switch the standby state for identifying whether the signal is received from the touch sensor to the inactive state.

In various example embodiments, the fingerprint sensor may be physically connected with the touch sensor.

Figure 4:
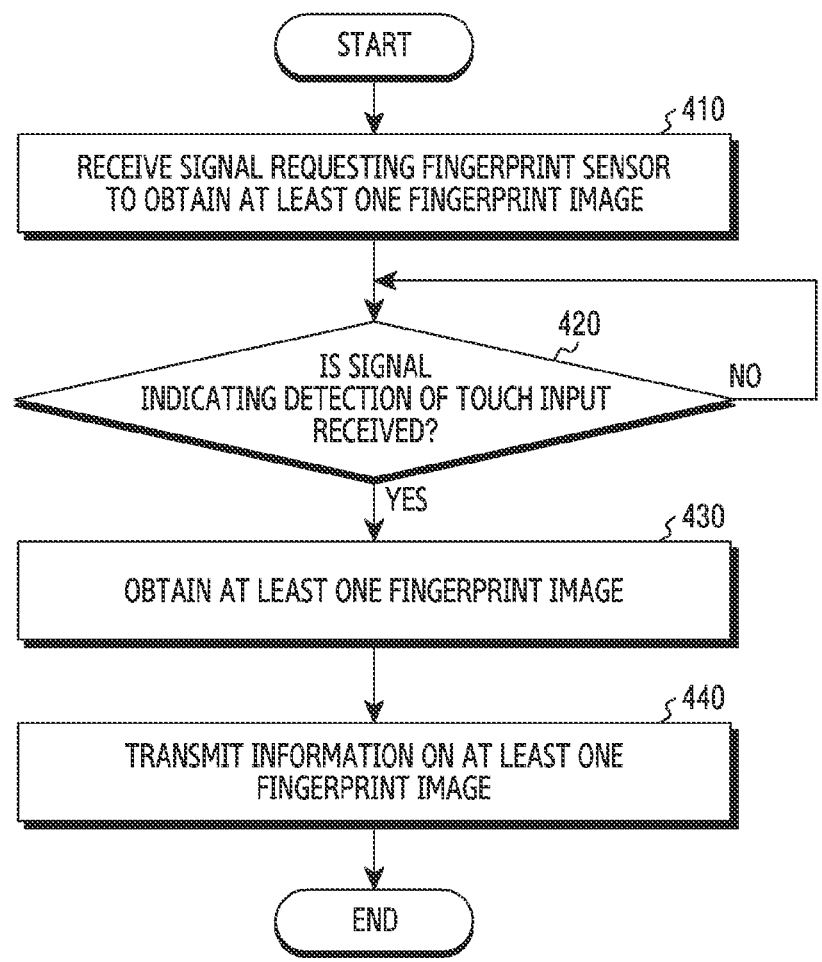
FIG. 4 is a flowchart illustrating an example operation of an electronic device according to various embodiments.

FIG. 4 is a flowchart illustrating an example operation of an electronic device according to various embodiments. This operation may be performed by the fingerprint sensor of FIG. 1 or the fingerprint sensor 210 of FIG. 2.

Referring to FIG. 4, in operation 410, the fingerprint sensor 210 may receive from the processor 120 a signal requesting the fingerprint sensor 210 to obtain at least one fingerprint image. For example, the fingerprint sensor 210 may receive from the processor 120 the signal requesting the fingerprint sensor 210 to obtain the at least one fingerprint image in order to register the fingerprint. For example, the signal may be transmitted from the processor 120 to the fingerprint sensor 210, in response to detecting a user input for registering the fingerprint in the processor 120. For another example, the fingerprint sensor 210 may receive from the processor 120 the signal requesting the fingerprint sensor 210 to obtain at least one fingerprint image, in order to recognize the fingerprint. For example, the signal may be transmitted from the processor 120 to the fingerprint sensor 210, based on an event caused while an application (e.g., a payment application) is executed to request for user authentication through a fingerprint in the processor 120.

In operation 420, in response to receiving the signal from the processor 120, the fingerprint sensor 210 may identify whether a signal indicating the detection of the touch input is received from the touch sensor 220. For example, the fingerprint sensor 210 may be in a standby state until the signal indicating the detection of the touch input is received from the touch sensor 220. The fingerprint sensor 210 may wait until the signal indicating the detection of the touch input is received from the touch sensor 220, in order to obtain a fingerprint image in a state where a finger is in proximity to the display unit 160.

In operation 430, the fingerprint sensor 210 may obtain the at least one image, in response to receiving the signal indicating the detection of the touch input from the touch sensor 220 ("Yes" in operation 420). In various embodiments, since the fingerprint sensor 210 may obtain at least one fingerprint image in response to receiving the signal indicating the detection of the touch input from the touch sensor 220, the at least one image may be obtained in a state where the user's finger is contacted on the display unit 160.

In operation 440, the fingerprint sensor 210 may transmit information on the at least one fingerprint image to the processor 120, in response to obtaining the at least one image. For example, the fingerprint sensor 210 may provide the information on the at least one fingerprint image to the processor 120, in order to register the fingerprint. For another example, the fingerprint sensor 210 may provide the information on the at least one fingerprint image to the processor 120, in order to recognize the fingerprint.

As described above, the electronic device 101 according to various embodiments may obtain a fingerprint image for registering a fingerprint (or a fingerprint image for recognizing a fingerprint) using the fingerprint sensor 210, while the user's finger is contacted on the display unit 160.

Figure 5:
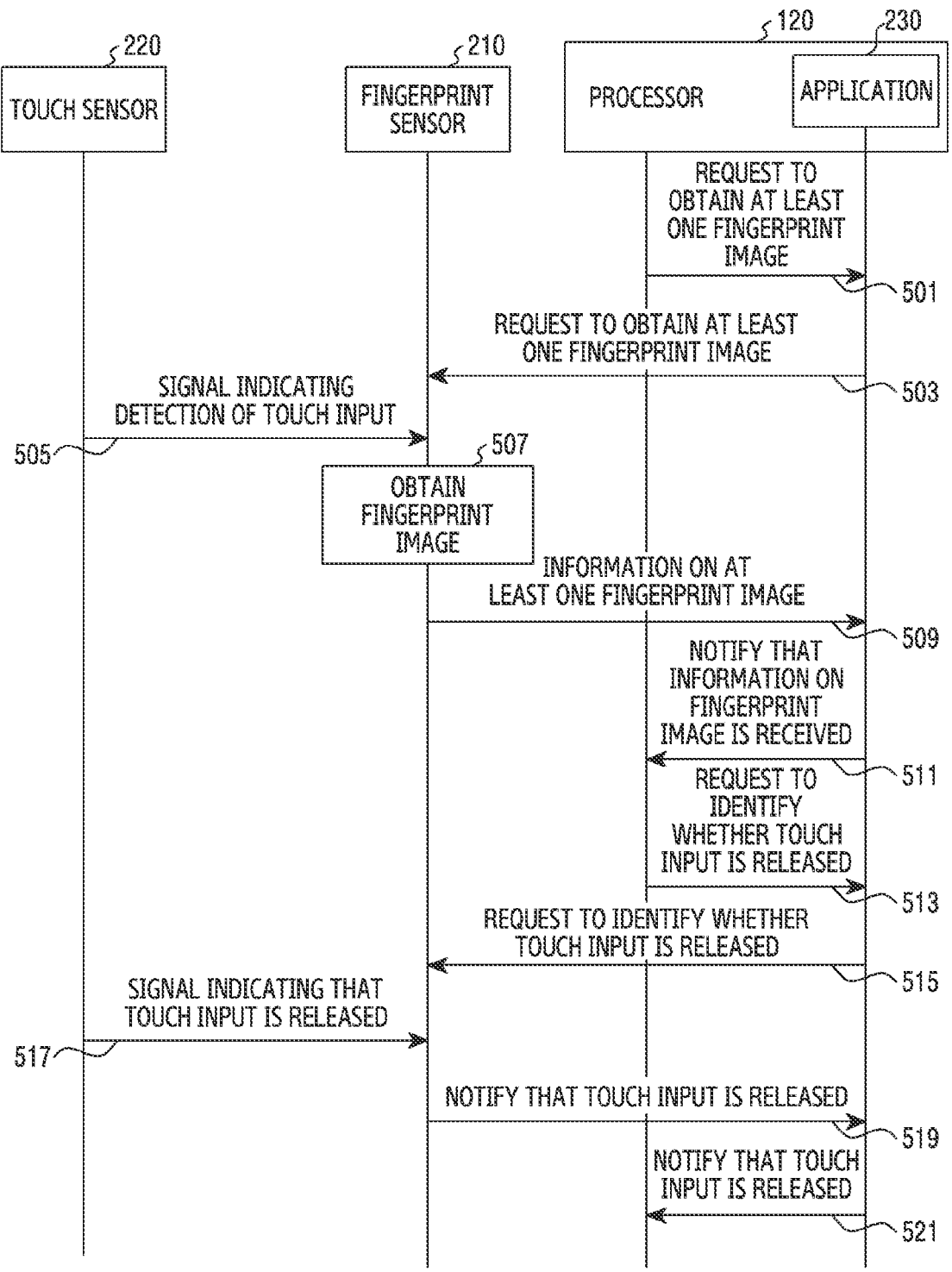
FIG. 5 is a signal flow diagram illustrating example operations for registering a fingerprint by components in an electronic device according to various embodiments.

FIG. 5 is a signal flow diagram illustrating example operations for registering a fingerprint by components in an electronic device according to various embodiments. These operations may be performed by at least one of the processor 120 of FIG. 1 or FIG. 2, the fingerprint sensor 210 of FIG. 1 or FIG. 2, and the touch sensor 220 of FIG. 1 or FIG. 2.

In FIG. 5, operations illustrated and described as being performed by the application 230 may imply operations executed by the at least one first core for the secure execution environment among multiple cores of the processor 120. In addition, in FIG. 5, an information exchange of the processor 120 and the application 230 may imply an information exchange between the at least one second core for the general execution environment and the at least one first core for the secure execution environment. However, the disclosure is not limited thereto.

Referring to FIG. 5, in operation 501, the processor 120 may request the application 230 to obtain at least one fingerprint image to register a fingerprint. For example, for the application 230 to be executed in the secure execution environment, the processor 120 may allocate at least one first core as a core for the secure execution environment among multiple cores of the processor 120, and may use at least one second core for the general execution environment to request, through the at least one first core, the application 230 to obtain the at least one fingerprint image in order to register the fingerprint. In other words, by accessing the memory 130, the processor 120 may request the application 230 executed in the secure execution environment to obtain the at least one fingerprint image in order to register the fingerprint.

In operation 503, the application 230 may request the fingerprint sensor 210 to obtain the at least one fingerprint image. In various embodiments, the application 230 may command the fingerprint sensor 210 to wait until the touch input is received through the request to the fingerprint sensor 210, in order to obtain the at least one fingerprint image. The fingerprint sensor 210 may receive the request from the application 230. Based on the request, the fingerprint sensor 210 may be in a standby state for identifying whether the signal indicating the detection of the touch input is received from the touch sensor 220. In various embodiments, the standby state may be maintained for a designated time, or may be maintained until the signal is received from the touch sensor 220.

In operation 505, in response to detecting the touch input on the display unit 160, the touch sensor 220 may transmit the signal indicating the detection of the touch input to the fingerprint sensor 210. In various embodiments, the signal may be transmitted from the touch sensor 220 to the fingerprint sensor 210 through an interface between the touch sensor 220 and the fingerprint sensor 210. The fingerprint sensor 210 may receive the signal from the touch sensor 220 while in the standby state.

In operation 507, in response to receiving the signal indicating detection of the touch input, the fingerprint sensor 210 may obtain the at least one fingerprint image. For example, the fingerprint sensor 210 may obtain the at least one fingerprint image in order to register the fingerprint. In various embodiments, the at least one fingerprint image may be obtained while a user's finger is contacted on the display unit 160.

In operation 509, in response to the obtaining, the fingerprint sensor 210 may transmit information on the at least one fingerprint image to the application 230. For example, in response to the obtaining, the fingerprint sensor 210 may transmit information on the at least one fingerprint image to the application 230 through the at least one first core. The application 230 may receive the information on the at least one fingerprint image.

In operation 511, the application 230 may recognize that the at least one fingerprint image relates to a fingerprint, and in response to the recognition, may report (e.g., notify) to the processor 120 (e.g., the at least one second core of the processor 120) that information on the fingerprint image is received. For example, the application 230 may report to a general execution environment, which is distinct from the secure execution environment, that the information on the fingerprint image is received.

In operation 513, the processor 120 may request the application 230 to identify whether the touch input is released. For example, the processor 120 may request the application 230 to identify whether the touch input is released, through the at least one first core using the at least one second core. In various embodiments, in order to identify whether procedures for registering the fingerprint are complete, the processor 120 may request the application 230 to identify whether the touch input is released. In various embodiments, the application 230 may receive the request from the processor 120.

In operation 515, in response to the request from the processor 120, the application 230 may request the fingerprint sensor 210 to identify whether the touch input is released. The fingerprint sensor 210 may receive the request from the application 230 through the at least one first core. Based on receiving the request from the application 230, the fingerprint sensor 210 may be in a standby state for identifying whether the touch input is released. For example, the fingerprint sensor 210 may be in the standby state until the signal indicating the release of the touch input is received from the touch sensor 220.

In operation 517, the touch sensor 220 may transmit to the fingerprint sensor 210 the signal indicating the release of the touch input, while the fingerprint sensor 210 is in the standby state. For example, in response to identifying that a user's finger is separated from the display unit 160, the touch sensor 220 may transmit to the fingerprint sensor 210 the signal indicating the release of the touch input. The fingerprint sensor 210 may receive from the touch sensor 220 the signal indicating the release of the touch input.

In operation 519, the fingerprint sensor 210 may notify the application 230 that the touch input is released. For example, the fingerprint sensor 210 may notify the application 230 of the release of the touch input through the at least one first core. For example, the fingerprint sensor 210 may notify the application 230 of the release of the touch input, in order to complete operations for registering the fingerprint. The application 230 may receive the notification from the fingerprint sensor 210.

In operation 521, the application 230 may notify the processor 120 that the touch input is released, in order to notify the general execution environment that operations for registering the fingerprint are successfully complete. For example, the application 230 may notify the at least one second core for the general execution environment that the touch input is released, through the at least one first core. The processor 120 may receive the notification from the application 230. In response to the reception, the processor 120 may identify that the operations for registering the fingerprint are complete, and may switch a screen displayed on the display unit 160 to register the fingerprint to another screen, based on the identification. However, the disclosure is not limited thereto.

As described above, the electronic device 101 according to various embodiments may obtain the fingerprint image for registering the fingerprint using the fingerprint sensor 210 disposed below the display unit 160, under the condition that the touch input is obtained using the touch sensor 220. Through the obtaining of the fingerprint image, the electronic device 101 according to various embodiments may enhance the operations for recognizing the fingerprint.

Figure 6:
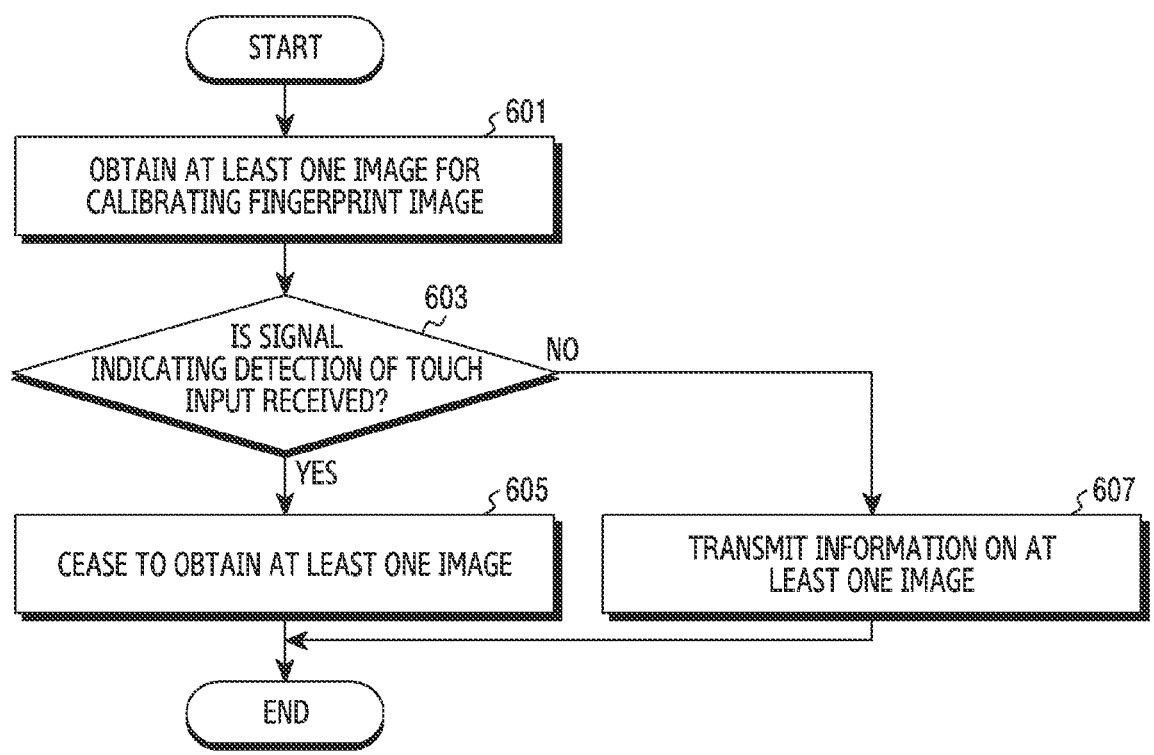
FIG. 6 is a flowchart illustrating an example operation of an electronic device according to various embodiments.

FIG. 6 is a flowchart illustrating an example operation of the electronic device 101 according to various embodiments. This operation may be performed by the fingerprint sensor of FIG. 1 or the fingerprint sensor 210 of FIG. 2.

Referring to FIG. 6, in operation 601, the fingerprint sensor 210 may obtain at least one image for calibrating a fingerprint image. For example, the fingerprint sensor 210 may obtain at least one image for calibrating the fingerprint image, in response to detecting that a designated event occurs in the electronic device 101. In various embodiments, the designated event may include detecting in the electronic device 101 that it is directly before performing fingerprint recognition (e.g., an application requiring fingerprint recognition is executed in the electronic device 101, entering a menu for setting a fingerprint is detected in the electronic device 101). An example of the designated event detected by the fingerprint sensor 210 will be described below with reference to FIG. 10 and FIG. 11.

In various embodiments, the at least one image may imply an image required to be obtained in a state of not including an external object such as a user's finger, a foreign material, or the like. In various embodiments, the at least one image may imply an image for configuring at least one value for tuning of the fingerprint sensor 210. In various embodiments, the at least one value may be registered or stored in the memory 130 as respectively associated with at least one temperature.

In operation 603, while obtaining the at least one image, the fingerprint sensor 210 may identify whether a signal indicating detection of a touch input is received from the touch sensor 220. The detecting of the touch input may imply that the external object is included in the at least one image. Therefore, the fingerprint sensor 210 may identify whether the signal indicating the detection of the touch input is received from the touch sensor 220, while obtaining the at least one image. The fingerprint sensor 210 may maintain the identification, while obtaining the at least one image.

In operation 605, while obtaining the at least one fingerprint image, in response to receiving the signal indicating the detection of the touch input, the fingerprint sensor 210 may cease to obtain the at least one image. The detection of the touch input implies that the external object (e.g., a finger contacted on the display unit 160) is included in the at least one image. Therefore, in response to receiving the signal from the touch sensor 220, the fingerprint sensor 210 may cease to obtain the at least one image to cease the calibration.

In operation 607, in response to not receiving the touch input while obtaining the at least one image, the fingerprint sensor 210 may transmit information on the at least one image to the processor 120. For example, in response to not receiving the signal indicating the detection of the touch input while obtaining the at least one image, the fingerprint sensor 210 may transmit information on the at least one image to the application 230 through the at least one first core.

As described above, based on receiving the touch input while performing the calibration for tuning of the fingerprint sensor 210, the electronic device 101 according to various embodiments may cease the calibration, thereby preventing and/or reducing the calibration from being performed unnecessarily or incorrectly. The electronic device 101 according to various embodiments may cease the calibration to prevent and/or reduce the calibration from being performed unnecessarily or incorrectly, thereby preventing and/or reducing power from being unnecessarily consumed in the electronic device 101.

Figure 7:
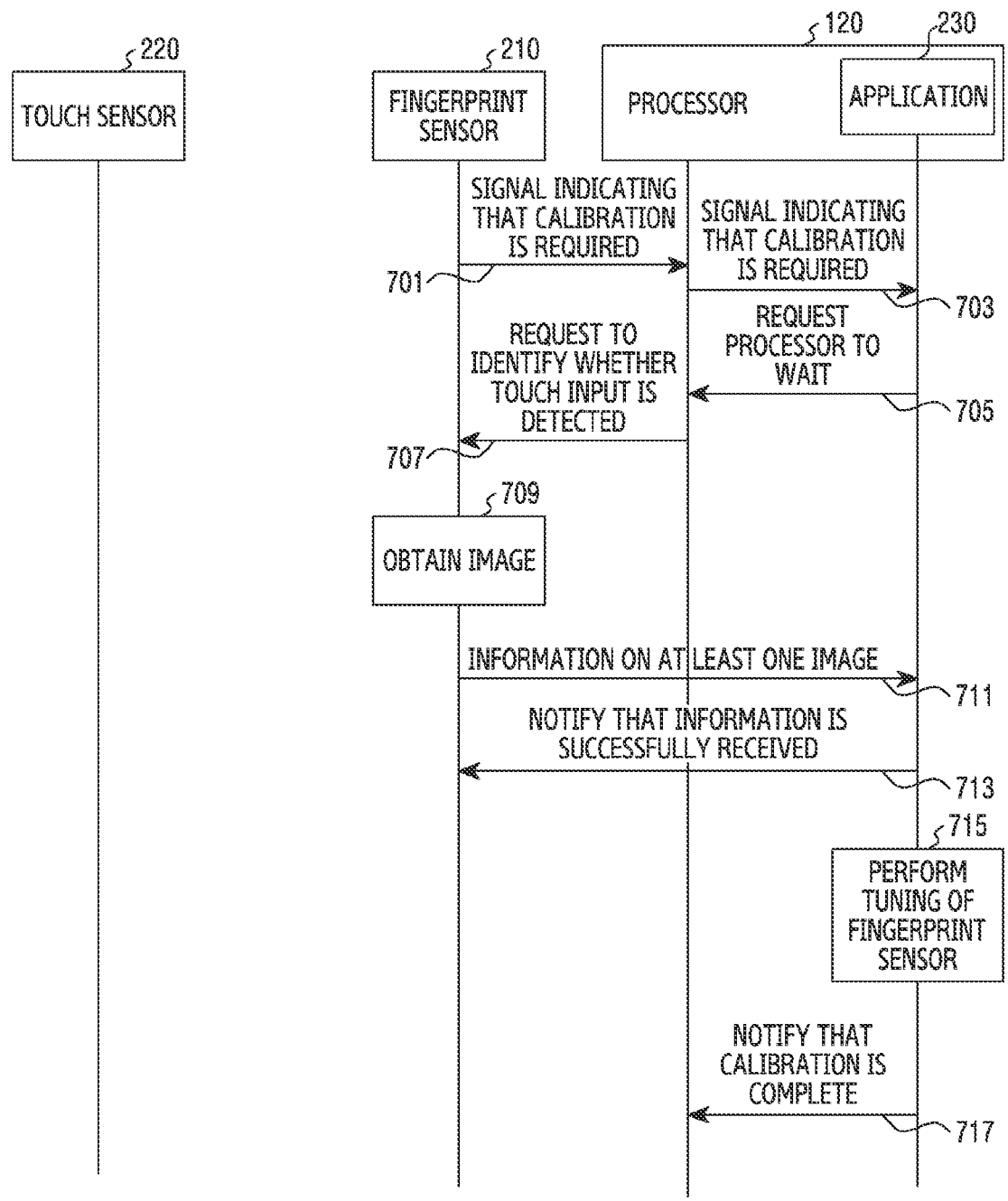
FIG. 7 is a signal flow diagram illustrating example operations for calibrating a fingerprint image by components in an electronic device in a state where no touch input is received according to various embodiments.

FIG. 7 is a signal flow diagram illustrating example operations for calibrating a fingerprint image by components in an electronic device in a state where no touch input is received according to various embodiments. These operations may be performed by at least one of the processor 120 of FIG. 1 or FIG. 2, the fingerprint sensor 210 of FIG. 1 or FIG. 2, or the touch sensor 220 of FIG. 1 or FIG. 2.

In FIG. 7, operations illustrated and described as being performed by the application 230 may imply operations executed by the at least one first core for the secure execution environment among multiple cores of the processor 120. In addition, in FIG. 7, operations illustrated and described as being performed by the application 230 may imply operations executed by the at least one first core for the secure execution environment among the multiple cores of the processor 120.

Referring to FIG. 7, in operation 701, the fingerprint sensor 210 may transmit to the processor 120 a signal indicating that a calibration of a fingerprint image is required. For example, the fingerprint sensor 210 may transmit to the at least one second core of the processor 120 the signal indicating that the calibration of the fingerprint image is required. The processor 120 may receive the signal from the fingerprint sensor 210.

In operation 703, the processor 120 may provide the application 230 executed in the secure execution environment with the signal indicating that the calibration is required, by accessing the memory 130. In various embodiments, the processor 120 may provide the application with the signal indicating that the calibration is required, through the at least one first core, using the at least one second core. The application 230 may receive the signal indicating that the calibration is required. In various embodiments, the application 230 may identify that the calibration is initiated, based on the signal.

In operation 705, the application 230 may request the processor 120 to wait, based on receiving the signal. For example, for the calibration, the application 230 may request the processor 120 to cease the driving in a general execution environment for a designated time. In various embodiments, based on receiving the signal, the application 230 may request to wait for at least one operation executed by the at least one second core using the at least one first core. The processor 120 may receive the request from the application 230.

In operation 707, in response to receiving the request, the processor 120 may request the fingerprint sensor 210 to identify whether a touch input is detected. For example, based on receiving the request, the processor 120 may request the fingerprint sensor 210 to identify whether the touch input is detected, before switching a state of the processor 120 to a standby state. The fingerprint sensor 210 may receive the request from the processor 120.

In operation 709, in response to receiving the request, the fingerprint sensor 210 may obtain at least one image for the calibration. In the example of FIG. 7, the fingerprint sensor 210 may obtain the at least one image required for the calibration, in a state where the signal indicating the detection of the touch input is not received from the touch sensor 220.

In operation 711, the fingerprint sensor 210 may transmit information on the at least one image to the application 230. For example, the fingerprint sensor 210 may provide the information on the at least one image to the at least one first core, thereby transmitting the information on the at least one image to the application 230. The application 230 may receive the information on the at least one image from the fingerprint sensor 210.

In operation 713, the application 230 may notify the fingerprint sensor 210 that the information on the at least one image is successfully received. In various embodiments, in order to indicate that an additional image is unnecessary for the calibration, the application 230 may notify the fingerprint sensor 210 through the at least one first core that the information on the at least one image is successfully received.

In operation 715, the application 230 may perform the tuning of the fingerprint sensor 210, at least based on the information on the at least one image.

In operation 717, after performing the tuning, the application 230 may notify the processor 120 that the calibration is complete. For example, the application 230 may notify the at least one second core that the calibration is complete through the at least one first core, thereby notifying the general execution environment that the calibration is complete. In order to complete the calibration, the application 230 may perform the notification to the processor 120.

Figure 8:
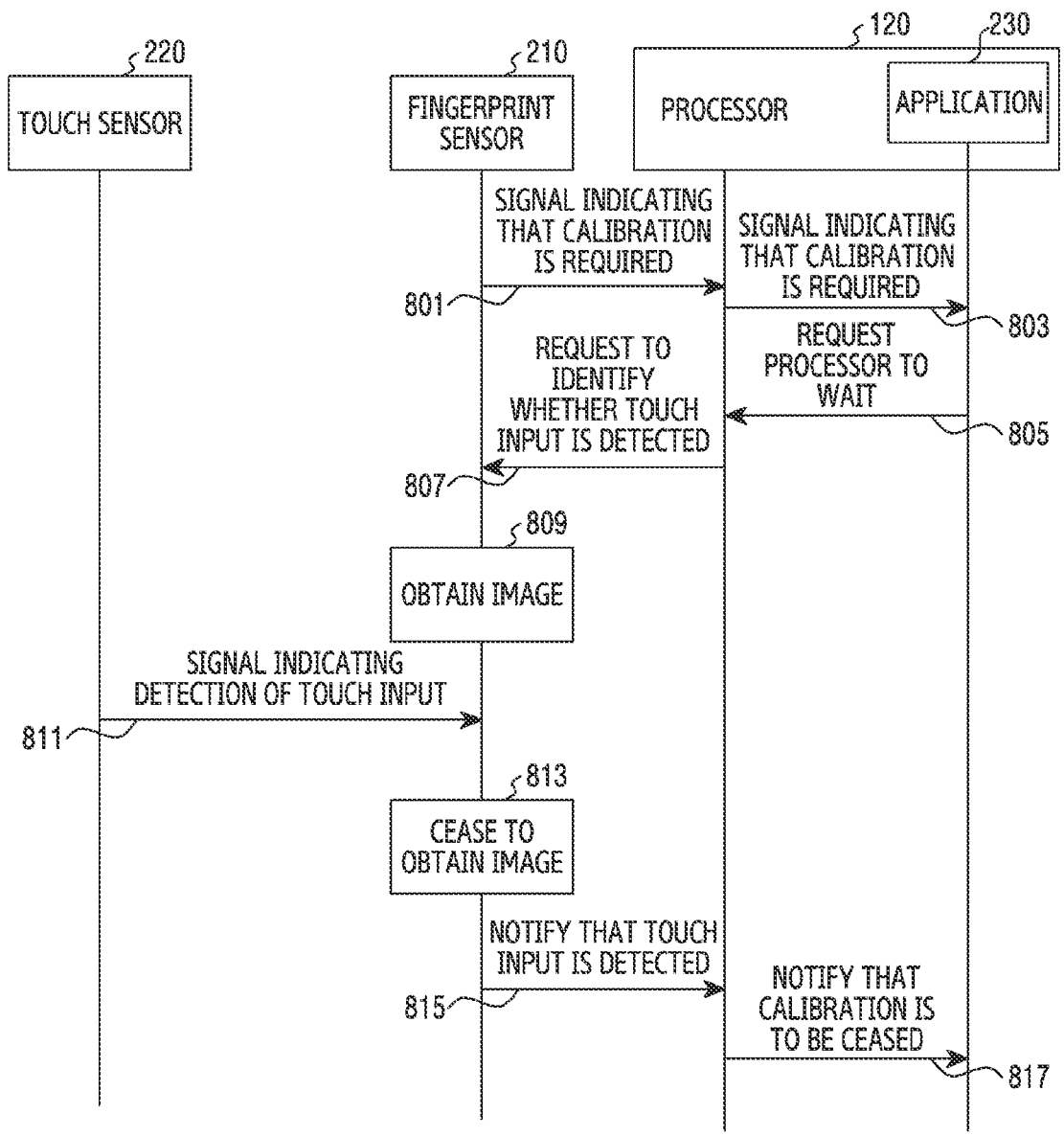
FIG. 8 is a signal flow diagram illustrating example operations for calibrating a fingerprint image by components in an electronic device in a state where a touch input is received according to various embodiments.

FIG. 8 is a signal flow diagram illustrating example operations for calibrating a fingerprint image by components in an electronic device in a state where a touch input is received according to various embodiments. These operations may be performed by at least one of the processor 120 of FIG. 1 or FIG. 2, the fingerprint sensor 210 of FIG. 1 or FIG. 2, or the touch sensor 220 of FIG. 1 or FIG. 2.

In FIG. 8, operations illustrated and described as being performed by the application 230 may imply operations executed by the at least one first core for the secure execution environment among multiple cores of the processor 120. In addition, in FIG. 8, an information exchange of the processor 120 and the application 230 may imply an information exchange between the at least one second core for the general execution environment and the at least one first core for the secure execution environment.

Referring to FIG. 8, in operation 801, the fingerprint sensor 210 may transmit to the processor 120 a signal indicating that a calibration of a fingerprint image is required. For example, the fingerprint sensor 210 may transmit to the at least one first core the signal indicating that the calibration of the fingerprint image is required. The processor 120 may receive the signal from the fingerprint sensor 210.

In operation 803, the processor 120 may provide the application 230 executed in the secure execution environment with the signal indicating that the calibration is required, by accessing the memory 130. The operation 803 may correspond to the operation 703 of FIG. 7.

In operation 805, the application 230 may request the processor 120 to wait, based on receiving the signal. The operation 805 may correspond to the operation 705 of FIG. 7.

In operation 807, in response to receiving the request, the processor 120 may request the fingerprint sensor 210 to identify whether a touch input is detected. The operation 807 may correspond to the operation 707 of FIG. 7.

In operation 809, in response to receiving the request, the fingerprint sensor 210 may obtain at least one image for the calibration.

In operation 811, while obtaining the at least one fingerprint image, the fingerprint sensor 210 may receive the signal indicating the detection of the touch input from the touch sensor 220. For example, based on detecting that a fingerprint is contacted on the display unit 160, the touch sensor 220 may transmit a signal indicating the detection of the touch input from the touch sensor 220 while the fingerprint sensor 210 obtains the at least one fingerprint image.

In operation 813, in response to receiving the signal from the touch sensor 220, the fingerprint sensor 210 may cease to obtain the at least one image. Since the at least one image is required not to include an external object for the calibration, the fingerprint sensor 210 may cease to obtain the at least one image, in response to receiving the signal from the touch sensor 220, in order to prevent and/or reduce an unnecessary or incorrect calibration.

In operation 815, based on that the obtaining of the at least one image is ceased, the fingerprint sensor 210 may notify the processor 120 that the touch input is detected. For example, in order to cease the calibration, the fingerprint sensor 210 may notify the processor 120 that the touch input is detected. The processor 120 may receive the notification from the fingerprint sensor 210. For example, the processor 120 may receive the notification from the fingerprint sensor 210 through the at least one second core.

In operation 817, in response to receiving the notification, the processor 120 may notify the application 230 that the calibration is to be ceased. For example, the processor 120 may use the at least one second core to notify the application 230 that the calibration is to be ceased through the at least one first core. For example, in response to receiving the notification, the processor 120 may notify the application 230 that the calibration is to be ceased, in order to prevent and/or reduce the application 230 from performing an unnecessary or incorrect calibration.

As described above, based on detecting that an external object is contacted on the display unit 160, the electronic device 101 according to various embodiments may cease to obtain the at least one image for calibrating the fingerprint image using the fingerprint sensor 210, thereby improving resource efficiency.

Figure 9:
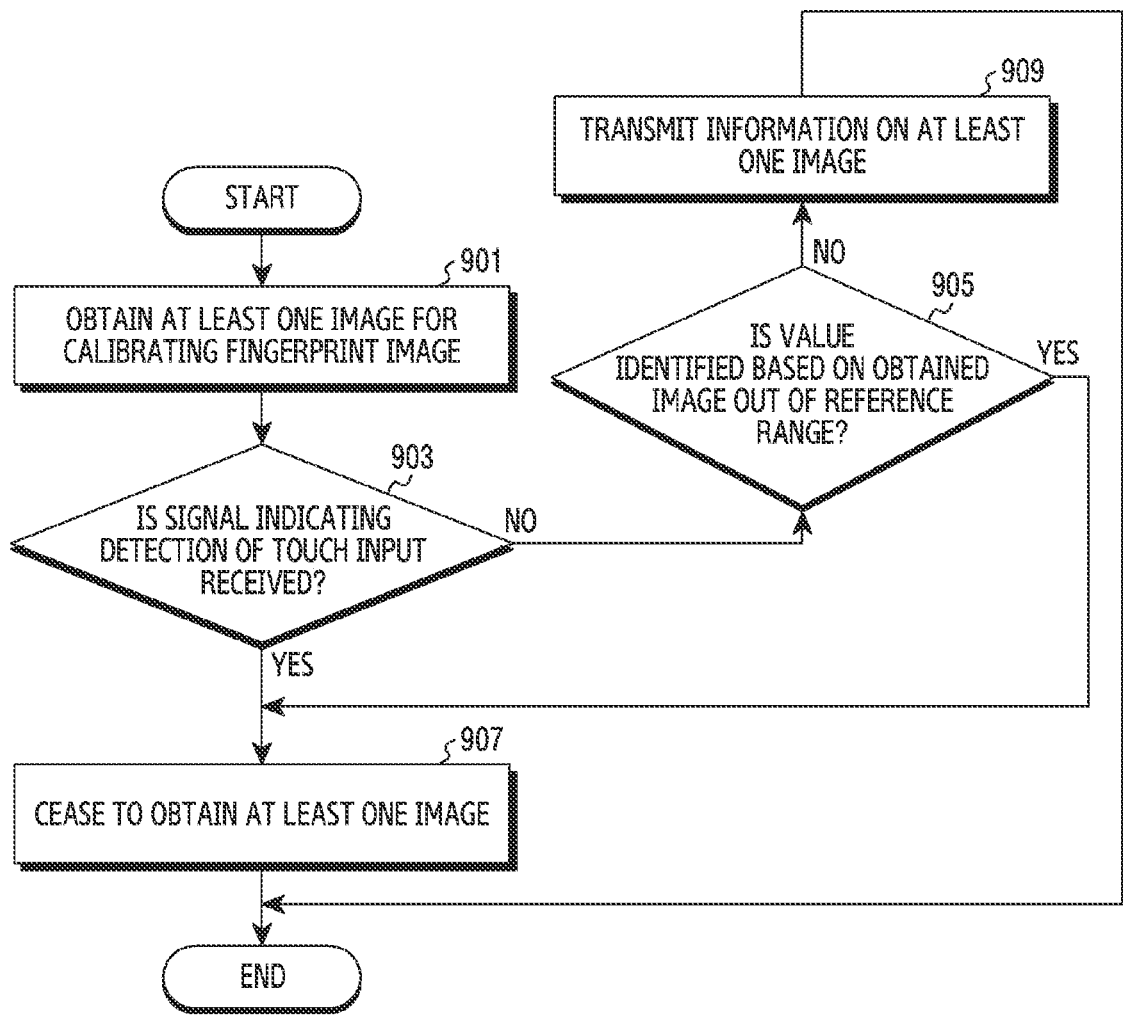
FIG. 9 is a flowchart illustrating an example operation of a fingerprint sensor of an electronic device which ceases to obtain an image according to various embodiments.

FIG. 9 is a flowchart illustrating an example operation of a fingerprint sensor of an electronic device which ceases to obtain an image according to various embodiments. This operation may be performed by the fingerprint sensor of FIG. 1 or the fingerprint sensor 210 of FIG. 2.

Referring to FIG. 9, in operation 901, the fingerprint sensor 210 may obtain at least one image for calibrating a fingerprint image. The operation 901 may correspond to the operation 601 of FIG. 6.

In operation 903, the fingerprint sensor 210 may identify whether a signal indicating the detection of the touch input is received from the touch sensor 220 while obtaining the at least one image. The operation 903 may correspond to the operation 603 of FIG. 6.

In operation 905, the fingerprint sensor 210 may identify whether a value identified based on an image obtained in a state where the signal indicating the detection of the touch input is not received from the touch sensor 220 is out of a reference range. For example, in order to identify whether a foreign material is included in the at least one image, the fingerprint sensor 210 may identify whether the value identified based on the image obtained in the state where the signal indicating the detection of the touch input is not received from the touch sensor 220 is out of the reference range. If the value is within the reference range, the fingerprint sensor 210 may perform operation 909. If the value is out of the reference range, the fingerprint sensor 210 may perform operation 907.

In operation 907, the fingerprint sensor 210 may cease to obtain the at least one image, based on identifying that the value identified based on the image obtained in the state where the signal indicating the detection of the touch input is received from the touch sensor 220 or the signal is not received from the touch sensor 220 is out of the reference range.

In operation 909, based on identifying that the value is within the reference range, the fingerprint sensor 210 may transmit information on the at least one image to the processor 120. For example, in response to identifying that the signal indicating the detection of the touch input is not received while obtaining the at least one image and that the value identified based on the obtained image is within the reference range, the fingerprint sensor 210 may transmit the information on the at least one image to the application 230 through the at least one first core of the processor 120.

As described above, the electronic device 101 according to various embodiments may check whether an image obtained in parallel with receiving of the information on the touch input from the touch sensor 220 is an image suitable for calibration, thereby preventing and/or reducing the calibration from being performed unnecessarily or incorrectly.

Figure 10:
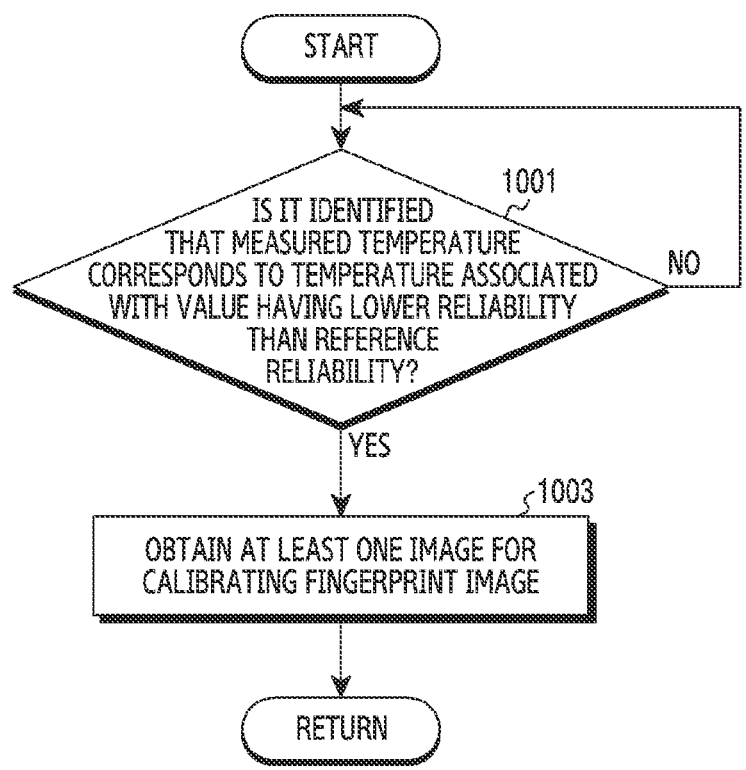
FIG. 10 is a flowchart illustrating an example operation of a fingerprint sensor of an electronic device which performs triggering to obtain at least one image for calibrating a fingerprint image according to various embodiments.

FIG. 10 is a flowchart illustrating an example operation of a fingerprint sensor of an electronic device which performs triggering to obtain at least one image for calibrating a fingerprint image according to various embodiments. This operation may be performed by the fingerprint sensor of FIG. 1 or the fingerprint sensor 210 of FIG. 2.

Operations 1001 and 1003 of FIG. 10 may be associated with the operation 601 of FIG. 6.

Referring to FIG. 10, in operation 1001, the fingerprint sensor 210 may identify whether a temperature (or a current temperature) measured by the electronic device 101 corresponds to a temperature associated with a value having a lower reliability than a reference reliability. For example, the memory 130 may store a plurality of values used to tune the fingerprint sensor 210. In various embodiments, the plurality of values may be stored as respectively associated with a plurality of temperatures. The fingerprint sensor 210 may identify whether the temperature measured by the electronic device 101 corresponds to a value having a lower reliability than the reference reliability or other values. Upon identifying that the temperature measured by the electronic device 101 does not correspond to the temperature associated with the value having the lower reliability than the reference reliability, the fingerprint sensor 210 may periodically perform operation 1001. Otherwise, upon identifying that the temperature measured by the electronic device 101 corresponds to the temperature associated with the value having the lower reliability than the reference reliability, the fingerprint sensor 210 may perform operation 1003.

In operation 1003, based on identifying that the temperature measured by the electronic device 101 corresponds to the temperature associated with the value having the lower reliability than the reference reliability, the fingerprint sensor 210 may obtain the at least one image for calibrating the fingerprint image.

As described above, the fingerprint sensor 210 of the electronic device 101 according to various embodiments may calibrate a value having a low reliability among values used to tune the fingerprint sensor 210, thereby improving a fingerprint recognition rate.

Figure 11:
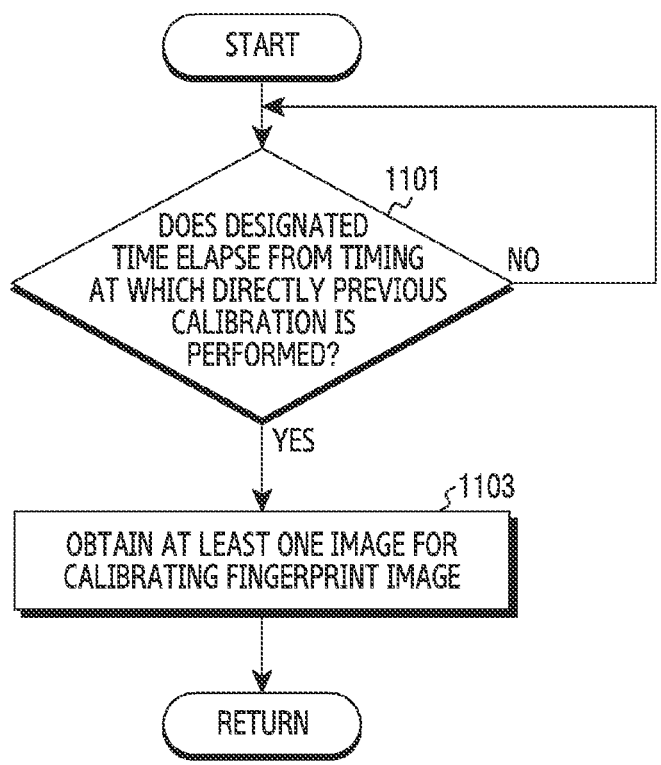
FIG. 11 is a flowchart illustrating an example operation of a fingerprint sensor of an electronic device which performs triggering to obtain at least one image for calibrating a fingerprint image according to various embodiments.

FIG. 11 is a flowchart illustrating an example operation of a fingerprint sensor of an electronic device which performs triggering to obtain at least one image for calibrating a fingerprint image according to various embodiments. This operation may be performed by the fingerprint sensor of FIG. 1 or the fingerprint sensor 210 of FIG. 2.

Operations 1101 and 1103 of FIG. 11 may be associated with the operation 601 of FIG. 6.

Referring to FIG. 11, in operation 1101, the fingerprint sensor 210 may identify whether a designated time elapses from a timing at which a directly previous calibration is performed. For example, in order to improve reliability of the calibration or to match an operation of the fingerprint sensor 210 to a recent environment related to the electronic device 101, the fingerprint sensor 210 may identify whether a designated time elapses from a timing at which the directly previous calibration is performed. The fingerprint sensor 210 may periodically perform the operation 1101, based on identifying that the designated time does not elapse from the timing at which the directly previous calibration is performed. The fingerprint sensor 210 may perform operation 1103, based on identifying that the designated time elapses from the timing at which the directly previous calibration is performed.

In operation 1103, the fingerprint sensor 210 may obtain the at least one image for calibrating the fingerprint image, based on identifying that the designated time elapses from a timing at which the directly previous calibration is performed.

As described above, the fingerprint sensor 210 of the electronic device 101 according to various embodiments may periodically update a state of values used for tuning of the fingerprint sensor 210, thereby improving a fingerprint recognition rate.

Figure 12:
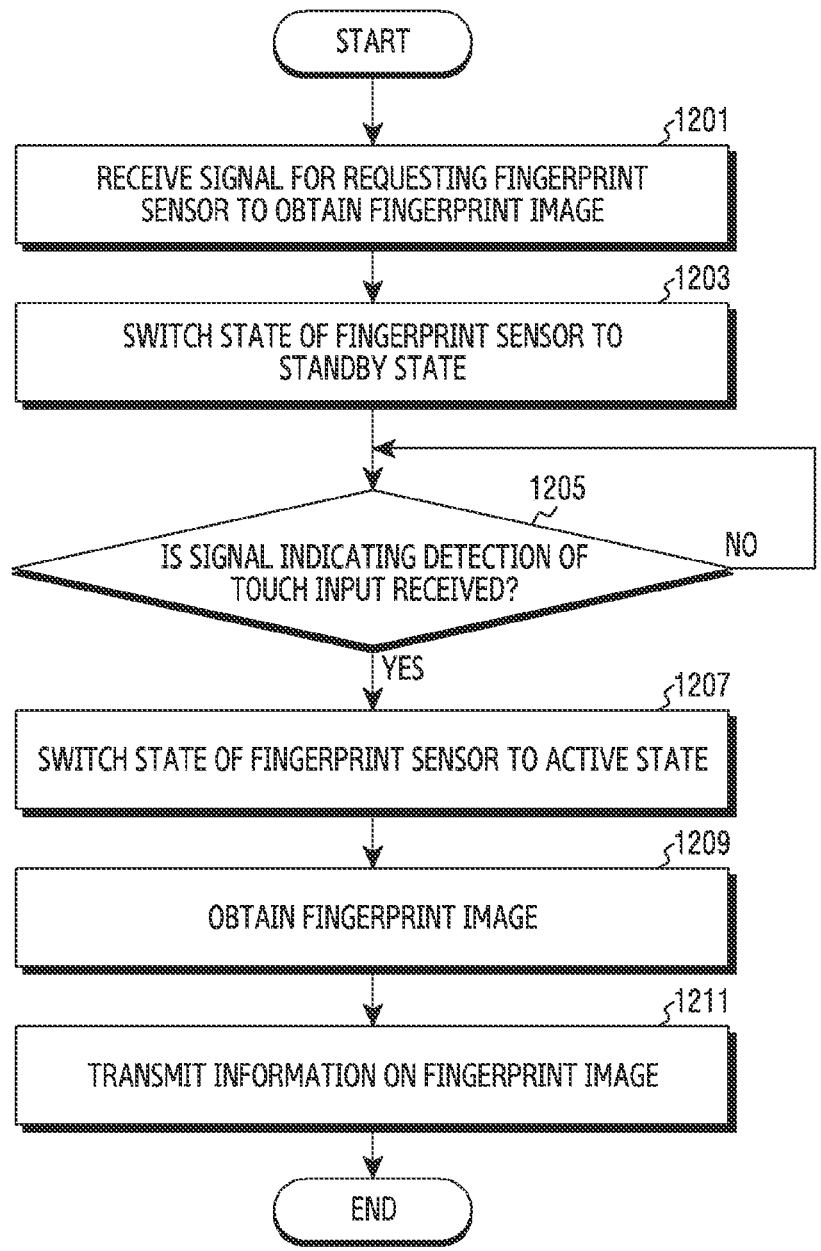
FIG. 12 is a flowchart illustrating an example operation of an electronic device according to various embodiments.

FIG. 12 is a flowchart illustrating an example operation of an electronic device according to various embodiments.

This operation may be performed by the fingerprint sensor of FIG. 1 or the fingerprint sensor 210 of FIG. 2.

Referring to FIG. 12, in operation 1201, the fingerprint sensor 210 may receive from the processor 120 a signal requesting the fingerprint sensor 210 to obtain a fingerprint image. For example, in response to detecting that an application requiring fingerprint recognition is executed or a user grips the electronic device 101 in a locking state, the processor 120 may transmit to the fingerprint sensor 210 the signal requesting to obtain the fingerprint image.

In operation 1203, in response to receiving the signal from the processor 210, the fingerprint sensor 210 may switch the state of the fingerprint sensor 210 to the standby state. The fingerprint sensor 210 may be in an inactive state before receiving the signal, in order to reduce power consumed by an operation of the fingerprint sensor 210. While in the inactive state, in response to receiving the signal from the processor 210, the fingerprint sensor 210 may switch the state of the fingerprint sensor 210 to the standby state to identify whether the touch input is detected.

In operation 1205, the fingerprint senor 210 may identify whether the signal indicating the detection of the touch input is received from the touch sensor, while in the standby state. If the signal is not received from the touch sensor 220, the fingerprint sensor 210 may maintain the identification. If the signal is received from the touch sensor 220, the fingerprint sensor 210 may perform operation 1207.

In operation 1207, in response to receiving the signal from the touch sensor 220, the fingerprint sensor 210 may switch the state of the fingerprint sensor 210 to an active state for obtaining the fingerprint image.

In operation 1209, the fingerprint sensor 210 may obtain the fingerprint image, in response to the switching to the active state.

In operation 1211, the fingerprint sensor 210 may transmit information on the fingerprint image to the processor 120, in order to recognize the obtained fingerprint image or to use the obtained fingerprint image for authentication. The information on the fingerprint image may be provided to the application 230 executed in the secure execution environment.

As described above, the electronic device 101 according to various embodiments may obtain the fingerprint image using the fingerprint sensor 210 under the condition that a finger is contacted on the display unit 160. Through the obtaining of the fingerprint image, the electronic device 101 according to various embodiments may enhance the operations for recognizing the fingerprint.

Figure 13:
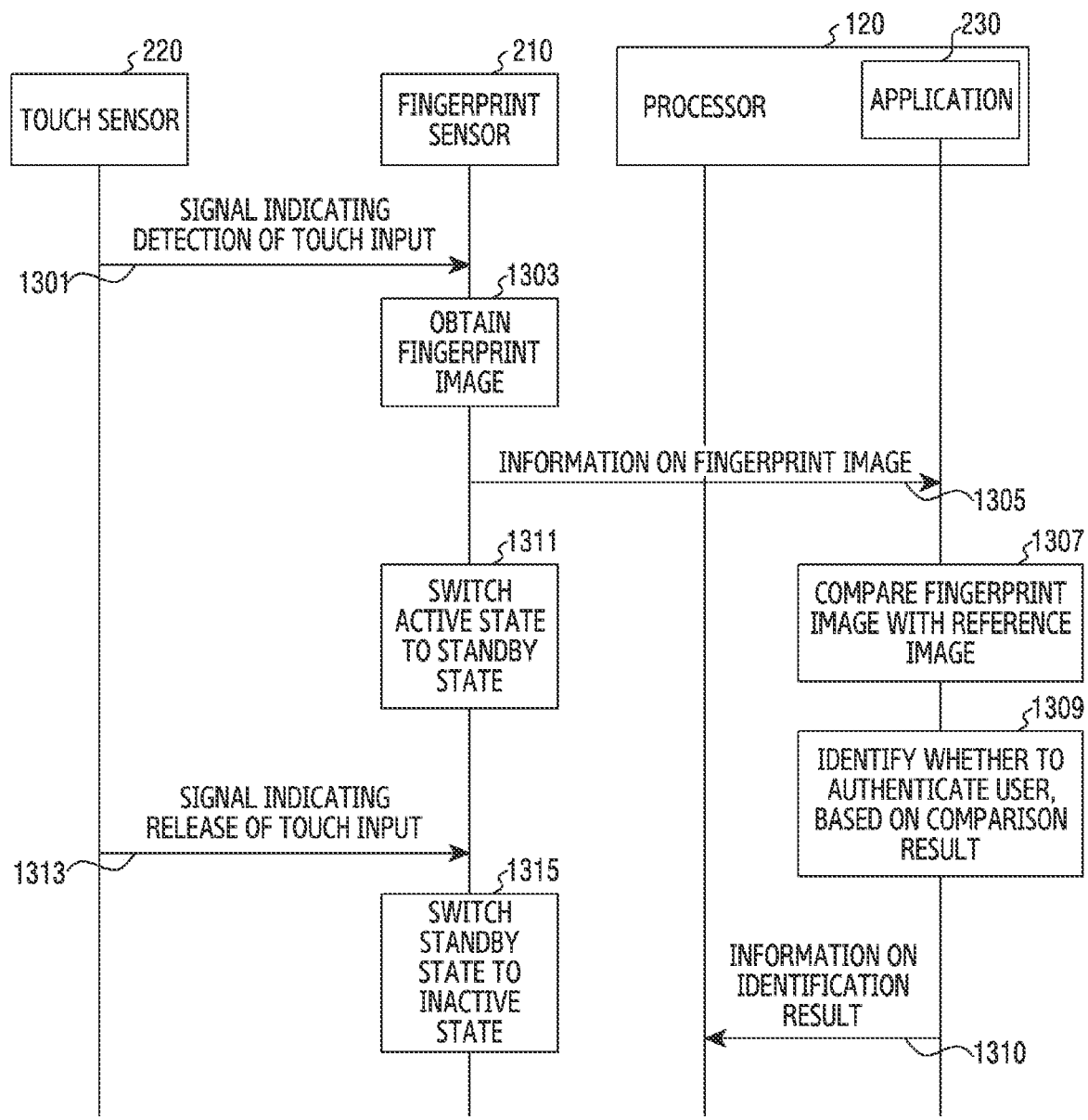
FIG. 13 is a signal flow diagram illustrating example operations of components of an electronic device for authentication which uses a fingerprint according to various embodiments.

FIG. 13 is a signal flow diagram illustrating example operations of components of an electronic device for authentication which uses a fingerprint according to various embodiments. These operations may be performed by at least one of the processor 120 of FIG. 1 or FIG. 2, the fingerprint sensor 210 of FIG. 1 or FIG. 2, and the touch sensor 220 of FIG. 1 or FIG. 2.

Referring to FIG. 13, in operation 1301, in response to detecting a touch input, the touch sensor 220 may transmit to the fingerprint sensor 210 a signal indicating the detection of the touch input. The fingerprint sensor 210 may receive the signal from the touch sensor 220.

In operation 1303, in response to receiving the signal from the touch sensor 220, the fingerprint sensor 210 may obtain a fingerprint image. The fingerprint sensor 210 may obtain the fingerprint image to authenticate a user.

In operation 1305, in response to obtaining the fingerprint image, the fingerprint sensor 210 may provide information on the fingerprint image to the application 230 executed in the secure execution environment of the processor 120. For example, in response to obtaining the fingerprint image, the fingerprint sensor 210 may provide the information on the fingerprint image to the application 230 through the at least one first core. The application 230 may receive the information on the fingerprint image.

In operation 1307, the application 230 may compare the fingerprint image with a reference image stored in a secure region.

In operation 1309, based on the comparison result, the application 230 may identify whether to authenticate a user.

In operation 1310, the application 230 may provide information on the identification result to the processor 120. For example, the application 230 may provide the information on the identification result to the general execution environment of the processor 120. For example, the application 230 may provide the information on the identification result to the at least one second core through the at least one first core. In various embodiments, based on the identification result, the processor 120 may display a feedback for authentication on the display unit 160 through the at least one second core. For example, based on the identification result, the processor 120 may change a screen being displayed to indicate an authentication success, or may change a screen being displayed to indicate an authentication failure.

In operation 1311, after transmitting the information on the fingerprint image, the fingerprint sensor 210 may switch an active state for obtaining the fingerprint image to a standby state for identifying whether the touch input is released.

In operation 1313, the touch sensor 220 may transmit to the fingerprint sensor 210 a signal indicating that the touch input is released. The fingerprint sensor 210 may receive the signal from the touch sensor 220.

In operation 1315, in response to receiving the signal from the touch sensor 220, the fingerprint sensor 210 may switch the standby state to the inactive state. For example, the fingerprint sensor 210 may switch the standby state to the inactive state, in order to reduce power consumed by an operation of the fingerprint sensor 210.

Methods based on the embodiments disclosed in the claims and/or specification of the disclosure can be implemented in hardware, software, or a combination of both.

When implemented in software, computer readable recording medium for storing one or more programs (e.g., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (e.g., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. The program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific example embodiment proposed herein. However, the singular or plural expression is selected properly for a situation proposed for the convenience of explanation, and thus the disclosure is not limited to a single or a plurality of components. Therefore, a component expressed in a plural form can also be expressed in a singular form, or vice versa.

An electronic device and a method thereof according to various embodiments may use interworking between a touch sensor of the electronic device and a fingerprint sensor of the electronic device to obtain information associated with a fingerprint, thereby enhancing a recognition rate of the fingerprint.

Advantages acquired in the disclosure are not limited to the aforementioned advantages. Other advantages not mentioned herein can be clearly understood by those skilled in the art to which the disclosure pertains from the following descriptions.

While the disclosure has been illustrated and described with reference to various example embodiments thereof, it will be understood by those skilled in the art that various changes in form and details may be made therein without departing from the spirit and scope of the disclosure including that defined, for example, by the appended claims.

What is claimed is:

1. An electronic device comprising:
a display;
a fingerprint sensor disposed below the display;
a touch sensor operatively coupled with the display and the fingerprint sensor; and
at least one processor,
wherein the fingerprint sensor is configured to:
receive from the at least one processor a signal requesting the fingerprint sensor to obtain at least one fingerprint image to register a fingerprint or to recognize the fingerprint;
identify whether a signal indicating detection of a touch input is received from the touch sensor in response to receiving the signal requesting to obtain the at least one fingerprint image;
obtain the at least one fingerprint image in response to receiving the signal indicating the detection of the touch input from the touch sensor;

transmit, to the at least one processor, information on the at least one fingerprint image for the registration or recognition of the fingerprint, in response to the obtaining;

receive a signal indicating that the touch input is released from the touch sensor after transmitting the information on the at least one fingerprint image; and transmit the signal indicating that the touch input is released to the at least one processor in response to receiving the signal indicating that the touch input is released.

2. The electronic device of claim 1, wherein the fingerprint sensor is configured to:

switch a state of the fingerprint sensor to a standby state for identifying whether the signal indicating the detection of the touch input is received from the touch sensor in response to receiving the signal requesting to obtain the at least one fingerprint image;

switch the standby state to an active state for obtaining the at least one fingerprint image in response to receiving the signal indicating the detection of the touch input from the touch sensor;

obtain the at least one fingerprint image in response to the switching to the active state; and switch the active state to the standby state for identifying whether the signal indicating that the touch input is released is received based on obtaining the at least one fingerprint image.

3. The electronic device of claim 1, further comprising a memory configured to store an application executable in a secure execution environment of the at least one processor, wherein the at least one processor is configured to:

request the application executed in the secure execution environment by accessing the memory, to obtain the at least one fingerprint image to register the fingerprint image, in response to receiving an input requesting to register the fingerprint; and transmit to the fingerprint sensor the signal requesting to obtain the at least one fingerprint image using the application which receives the request.

4. The electronic device of claim 3, wherein the application is configured to notify the at least one processor of a signal indicating that the fingerprint image is successfully obtained based on receiving information on the at least one fingerprint image.

5. The electronic device of claim 4, wherein the fingerprint sensor is configured to:

receive a signal indicating that the touch input is released from the touch sensor based on transmitting the information on the at least one fingerprint image; and transmit the signal indicating that the touch input is released to the at least one processor in response to receiving the signal indicating that the touch input is released, and wherein the at least one processor is further configured to:

receive a signal indicating that the touch input is released from the fingerprint sensor using the application; and identify that the registering of the fingerprint is successfully complete using the application, based on receiving the signal indicating that the touch input is released from the fingerprint sensor.

6. The electronic device of claim 1, wherein the fingerprint sensor is further configured to:

receive a signal indicating that the touch input is released from the touch sensor based on transmitting the information on the at least one fingerprint image;

transmit the signal indicating that the touch input is released to the at least one processor in response to receiving the signal indicating that the touch input is released; and switch a state of the fingerprint sensor to an inactive state based on the transmission of the signal indicating the touch input is released.

7. An electronic device comprising:

a display;

a fingerprint sensor disposed below the display;

a touch sensor operatively coupled with the fingerprint sensor and the display; and at least one processor, wherein the fingerprint sensor is configured to:

receive a signal requesting the fingerprint sensor to obtain a fingerprint image from the at least one processor while in an inactive state;

switch a state of the fingerprint sensor to a standby state for identifying whether a signal indicating detection of a touch input is received from the touch sensor in response to receiving the signal requesting the fingerprint sensor to obtain the fingerprint image;

switch the standby state to an active state in response to receiving the signal indicating the detection of the touch input from the touch sensor while in the standby state;

obtain the fingerprint image in response to the switching to the active state; and transmit information on the fingerprint image to the at least one processor in response to the obtaining.

8. The electronic device of claim 7, further comprising a memory configured to store an application executable in a secure execution environment of the at least one processor, wherein the at least one processor is configured to:

receive information on the fingerprint image using the application;

compare the fingerprint image with a reference fingerprint image registered in the electronic device using the application; and identify whether to authenticate a user who provides the fingerprint image based on the comparison result.

9. The electronic device of claim 7, wherein the fingerprint sensor is further configured to switch the active state to a standby state for identifying whether a signal indicating that the touch input is released is received from the touch sensor based on transmitting the information on the fingerprint image.

10. The electronic device of claim 9, wherein the fingerprint sensor is further configured to:

receive the signal indicating that the touch input is released from the touch sensor while in the standby state for identifying whether the signal indicating the release of the touch input is received from the touch sensor; and switch the standby state for identifying whether the signal is received from the touch sensor to the inactive state based on receiving the signal indicating that the touch input is released from the touch sensor.

11. The electronic device of claim 10, wherein the fingerprint sensor is configured to:

transmit to the at least one processor the signal indicating that the touch input is released in response to receiving the signal indicating that the touch input is released from the touch sensor; and switch the standby state for identifying whether the signal is received from the touch sensor to the inactive state based on transmitting the signal indicating that the touch input is released.

12. The electronic device of claim 7, wherein the fingerprint sensor is physically connected with the touch sensor.

13. A method for operating an electronic device, comprising:

receiving, by a fingerprint sensor of the electronic device, a signal requesting the fingerprint sensor to obtain at least one fingerprint image to register a fingerprint or to recognize the fingerprint from at least one processor of the electronic device;

identifying, by the fingerprint sensor, whether a signal indicating detection of a touch input is received from a touch sensor in response to receiving the signal requesting to obtain the at least one fingerprint image;

obtaining, by the fingerprint sensor, the at least one fingerprint image in response to receiving the signal indicating the detection of the touch input from the touch sensor;

transmitting, by the fingerprint sensor, information on the at least one fingerprint image for the registration or recognition of the fingerprint to the at least one processor, in response to the obtaining;

receiving, by the fingerprint sensor, a signal indicating that the touch input is released from the touch sensor after transmitting the information on the at least one fingerprint image; and transmitting, by the fingerprint sensor, the signal indicating that the touch input is released to the at least one processor in response to receiving the signal indicating that the touch input is released.

14. A method for operating an electronic device, comprising:

receiving, by a fingerprint sensor of the electronic device, a signal requesting the fingerprint sensor to obtain a fingerprint image from at least one processor of the electronic device while in an inactive state;

switching, by the fingerprint sensor, a state of the fingerprint sensor to a standby state for identifying whether a signal indicating detection of a touch input is received from a touch sensor of the electronic device in response to receiving the signal requesting the fingerprint sensor to obtain the fingerprint image;

switching, by the fingerprint sensor, the standby state to an active state in response to receiving the signal indicating the detection of the touch input from the touch sensor while in the standby state;

obtaining, by the fingerprint sensor, the fingerprint image in response to the switching to the active state; and transmitting, by the fingerprint sensor, information on the fingerprint image to the at least one processor in response to the obtaining.

* * * * *